US011139993B2

(12) United States Patent
Bourassa-Denis et al.

(10) Patent No.: US 11,139,993 B2
(45) Date of Patent: Oct. 5, 2021

(54) METHOD, APPARATUS, AND COMPUTER PROGRAM PRODUCT FOR GENERATING A PREDICTED CHANNEL ADD OBJECT IN A GROUP-BASED COMMUNICATION SYSTEM

(71) Applicant: Slack Technologies, Inc., San Francisco, CA (US)

(72) Inventors: Renaud Bourassa-Denis, New York City, NY (US); John Gallagher, New York City, NY (US); Michael Montazeri, New York, NY (US); Paul Rosania, San Francisco, CA (US); Jerry Talton, New York City, NY (US)

(73) Assignee: Slack Technologies, Inc., San Francisco, CA (US)

( * ) Notice: Subject to any disclaimer, the term of this patent is extended or adjusted under 35 U.S.C. 154(b) by 51 days.

(21) Appl. No.: 16/590,808

(22) Filed: Oct. 2, 2019

(65) Prior Publication Data

US 2020/0106630 A1 Apr. 2, 2020

Related U.S. Application Data

(60) Provisional application No. 62/740,208, filed on Oct. 2, 2018.

(51) Int. Cl.
*H04L 12/18* (2006.01)
(52) U.S. Cl.
CPC ................ *H04L 12/1818* (2013.01)
(58) Field of Classification Search
CPC .......... H04L 12/1818; H04L 12/1822
See application file for complete search history.

(56) References Cited

U.S. PATENT DOCUMENTS 8,620,385 B2 12/2013 Counts et al.
8,843,853 B1 9/2014 Smoak et al.
(Continued)

OTHER PUBLICATIONS

Scipy Community, scipy.ndimage.measurements.center_of_mass, Jan. 18, 2015, SciPy v0.15.1 Reference Guide (Year: 2015).*
(Continued)

*Primary Examiner* — Wing F Chan
*Assistant Examiner* — Billy H Ng
(74) *Attorney, Agent, or Firm* — Lee & Hayes, P.C.

(57) ABSTRACT

Embodiments of the present disclosure provide methods, systems, apparatuses, and computer program products that are configured to generate a predicted channel add object in an improved system of networked computing devices. The embodiments disclose an apparatus and system that provide channel invite suggestions. The channel invite suggestions comprise recommendations of users to invite to group-based communication channels. To provide the channel-invite suggestions, the group-based communication system generates a user-channel data structure that stores a plurality of values that capture relationships between users and group-based communication channels. The values may capture information regarding membership of a user in a group-based communication channel, starring of a group-based communication channel by a user, a level of activity of a user in a group-based communication channel, and a user's word usage in a group-based communication channel.

20 Claims, 22 Drawing Sheets

(56) References Cited

U.S. PATENT DOCUMENTS

| | | | |
|---|---|---|---|
| 9,940,394 B1 | 4/2018 | Grant et al. | |
| 2006/0167944 A1* | 7/2006 | Baker | H04L 67/18 |
| 2009/0226872 A1* | 9/2009 | Gunther | G09B 7/00 |
| | | | 434/350 |
| 2010/0241580 A1* | 9/2010 | Schleier-Smith | H04W 4/21 |
| | | | 705/319 |
| 2014/0025734 A1* | 1/2014 | Griffin | G06Q 50/01 |
| | | | 709/204 |
| 2017/0046374 A1 | 2/2017 | Fletcher et al. | |
| 2018/0287982 A1 | 10/2018 | Draeger et al. | |
| 2019/0386842 A1* | 12/2019 | Silva | H04L 12/1822 |
| 2020/0076634 A1* | 3/2020 | Akolkar | H04L 65/1093 |

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

|       | G827 | U1   | U2   | U3   |
|-------|------|------|------|------|
|       | U1   | NULL | NULL | NULL |
|       | U2   | NULL | NULL | NULL |
|       | U3   | NULL | NULL | NULL |

FIG. 12A

|       | G827 | U1   | U2   | U3   |
|-------|------|------|------|------|
|       | U1   | 1.0  | 0.89 | 0.45 |
|       | U2   | 0.89 | 1.0  | 0.0  |
|       | U3   | 0.45 | 0.0  | 1.0  |

FIG. 12B

Create a channel

Channels are where your members communicate. They're best when organized around a topic — #leads, for example.

Public Anyone in your workspace can view and join this channel.

Name

1510 — # ml-services-channel

Names must be lowercase, without spaces or periods, and shorter than 22 characters.

Purpose (optional)

1520 — A Channel for ML Services members

What's this channel about?

Send Invites to: (optional)

1530 — Search by name

Select up to 1000 people to add to this channel.

1550 —

Cancel   Create Channel

FIG. 14

Create a channel

Channels are where your members communicate. They're best when organized around a topic — #leads, for example.

Public Anyone in your workspace can view and join this channel.

Name ml-services-channel

Names must be lowercase, without spaces or periods, and shorter than 22 characters.

Purpose (optional)

A Channel for ML Services members

What's this channel about?

Send invites to: (optional) Recommended: ltandalla — 1610  — 1560

METHOD, APPARATUS, AND COMPUTER PROGRAM PRODUCT FOR GENERATING A PREDICTED CHANNEL ADD OBJECT IN A GROUP-BASED COMMUNICATION SYSTEM

CROSS-REFERENCE TO RELATED APPLICATIONS

This application claims priority to U.S. Provisional Application No. 62/740,208 filed Oct. 2, 2018, the content of which is incorporated herein by reference in its entirety.

BACKGROUND

Various messaging systems may support communication and collaboration among users. Applicant has identified a number of deficiencies and problems associated with collaborative communication systems. Through applied effort, ingenuity, and innovation, many of these identified problems have been solved by developing solutions that are included in embodiments of the present disclosure, many examples of which are described in detail herein.

BRIEF SUMMARY

Embodiments disclosed herein are directed to providing suggestions for channel invitations in a group-based communication system. One embodiment includes an apparatus configured for generating a predicted channel add object in the group-based communication system. The apparatus includes at least one processor and at least one memory including a computer program code. The memory and computer program code are configured to, with the processor, cause the apparatus to access a group-based communication repository that includes a plurality of user identifiers. Each of the plurality of user identifiers is associated with a group channel array. The apparatus is also configured to identify a selected user identifier of the plurality of user identifiers and a selected group channel array associated with the selected user identifier. The apparatus further receives a channel creation request associated with the selected user identifier. The apparatus also compares the selected group channel array to each group channel array associated with the remaining plurality of user identifiers to determine a channel array similarity score for each compared group channel array pair. Finally, the apparatus, upon receiving the channel creation request and in circumstances where at least one channel array similarity score satisfies a predetermined threshold, generates the predicted channel add object.

In embodiments, the apparatus is further configured to render a predicted channel add interface to a group-based communication interface of the group-based communication system based on the predicted channel add object. In a variation of this embodiment, the predicted channel add interface includes one or more channel invite components associated with a compared user identifier for any channel array similarity score that satisfies the predetermined threshold, and each of the one or more channel invite components is configured, upon user engagement, to execute a channel invitation protocol that is configured to add the compared user identifier to a channel access registry associated with the channel creation request.

In other embodiments, each group channel array includes channel access weight parameters determined based on user-channel access recency data.

In one embodiment, each group channel array includes channel access weight parameters determined based on user-channel access frequency data. In one variation of this embodiment, the user-channel access frequency data includes user-channel read frequency data. In a different variation of this embodiment, the user-channel access frequency data includes user-channel write frequency data. In yet another variation of this embodiment, the user-channel access frequency data is determined based on a logarithm of user-channel write frequency data and user-channel read frequency data.

In embodiments, each group channel array includes channel access weight parameters determined based on channel word count data.

Various embodiments are directed to a machine-implemented method for generating a predicted channel add object in a group-based communication system. The method includes the steps of accessing a group-based communication repository comprising a plurality of user identifiers, wherein each of the plurality of user identifiers is associated with a group channel array; identifying a selected user identifier of the plurality of user identifiers and a selected group channel array associated with the selected user identifier; receiving a channel creation request associated with the selected user identifier; comparing the selected group channel array to each group channel array associated with the remaining plurality of user identifiers to determine a channel array similarity score for each compared group channel array pair; and upon receiving the channel creation request and in circumstances where at least one channel array similarity score satisfies a predetermined threshold, generating the predicted channel add object.

In embodiments, the method further includes the step of rendering a predicted channel add interface to a group-based communication interface of the group-based communication system based on the predicted channel add object. In a variation of this embodiment, the predicted channel add interface includes one or more channel invite components associated with a compared user identifier for any channel array similarity score that satisfies the predetermined threshold, and each of the one or more channel invite components is configured, upon user engagement, to execute a channel invitation protocol that is configured to add the compared user identifier to a channel access registry associated with the channel creation request.

In other embodiments, each group channel array includes channel access weight parameters determined based on user-channel access recency data.

In one embodiment, each group channel array includes channel access weight parameters determined based on user-channel access frequency data. In one variation of this embodiment, the user-channel access frequency data includes user-channel read frequency data. In a different variation of this embodiment, the user-channel access frequency data includes user-channel write frequency data. In yet another variation of this embodiment, the user-channel access frequency data is determined based on a logarithm of user-channel write frequency data and user-channel read frequency data.

In embodiments, each group channel array includes channel access weight parameters determined based on channel word count data.

Various embodiments are directed to one or more non-transitory computer-readable media having encoded thereon one or more computer-executable instructions for performing a method for generating a predicted channel add object in a group-based communication system. The method includes the steps of accessing a group-based communication repository comprising a plurality of user identifiers, wherein each of the plurality of user identifiers is associated with a group channel array; identifying a selected user identifier of the plurality of user identifiers and a selected group channel array associated with the selected user identifier; receiving a channel creation request associated with the selected user identifier; comparing the selected group channel array to each group channel array associated with the remaining plurality of user identifiers to determine a channel array similarity score for each compared group channel array pair; and upon receiving the channel creation request and in circumstances where at least one channel array similarity score satisfies a predetermined threshold, generating the predicted channel add object.

In embodiments, the method further includes the step of rendering a predicted channel add interface to a group-based communication interface of the group-based communication system based on the predicted channel add object. In a variation of this embodiment, the predicted channel add interface includes one or more channel invite components associated with a compared user identifier for any channel array similarity score that satisfies the predetermined threshold, and each of the one or more channel invite components is configured, upon user engagement, to execute a channel invitation protocol that is configured to add the compared user identifier to a channel access registry associated with the channel creation request.

In other embodiments, each group channel array includes channel access weight parameters determined based on user-channel access recency data.

In one embodiment, each group channel array includes channel access weight parameters determined based on user-channel access frequency data. In one variation of this embodiment, the user-channel access frequency data includes user-channel read frequency data. In a different variation of this embodiment, the user-channel access frequency data includes user-channel write frequency data. In yet another variation of this embodiment, the user-channel access frequency data is determined based on a logarithm of user-channel write frequency data and user-channel read frequency data.

In embodiments, each group channel array includes channel access weight parameters determined based on channel word count data.

Various embodiments are directed to an apparatus configured to generate a predicted channel add object in a group-based communication system, the apparatus comprising at least one processor and at least one memory including a computer program code, the at least one memory and the computer program code configured to, with the at least one processor, cause the apparatus to: store channel membership data and other channel data in a plurality of data structures; generate comparison criteria data based on the channel data and store the comparison criteria data in a user-channel data structure such that each user identifier in the group-based communication system is associated with a group channel array; and generate a predicted channel add object in a group-based communication system based on the user-channel data structure, render a predicted channel add interface, and execute a channel invitation protocol.

In certain embodiments, the apparatus is further configured to generate and store a similarity-scores data structure based on the user-channel data structure.

In embodiments, to generate and store a similarity-scores data structure based on the user-channel data structure, the apparatus is further configured to generate and initialize a similarity-scores data structure with a plurality of null elements; retrieve a similarity-scores-data-structure row storing a first null element; determine a user identifier associated with the retrieved similarity-scores-data-structure row and designate it as a selected user identifier; retrieve, from the user-channel data structure, a group channel array associated with the selected user identifier, and designate the retrieved group channel array as a selected group channel array; determine a second user identifier corresponding to a second null element in the retrieved similarity-scores-data-structure row; retrieve, from the user-channel data structure, a second group channel array associated with the second user identifier; and generate and store, in the similarity scores data structure and in the retrieved similarity-scores-data-structure row, a similarity score based on the selected group channel array and the group channel array associated with the second user identifier.

In embodiments, the similarity score is determined based on a cosine similarity.

In other embodiments, to generate a predicted channel add object in a group-based communication system based on the user-channel data structure, render a predicted channel add interface, and execute a channel invitation protocol, the apparatus is further configured to: receive a channel creation request associated with a channel-creator user identifier; find a predetermined number of most-similar user accounts to a user account associated with the channel-creator user identifier; find a user accounts set, wherein each user account comprising the user accounts set has a similarity scores that exceed a minimum threshold score; generate a predicted channel add object based on the user accounts set; generate, based on the predicted channel add object, a predicted channel add interface data configured to cause a rendering of a predicted channel add interface that comprises one or more channel invite components; transmit, to a client device, the predicted channel add interface data; receive a first user selection of users to invite to a group-based communication channel; and upon receiving the first user selection, execute a channel invitation protocol that is configured to add a selected user account corresponding to the user selection to a channel access registry associated with the channel creation request.

In embodiments, the apparatus is further configured to: receive a first user selection of users to invite to a group-based communication channel; find a predetermined number of additional most-similar user accounts based on the user selection; wherein to find the predetermined number of additional most-similar user accounts, the computer program code is further configured to cause the apparatus to: find, for a first user account associated with the first user selection, a second user accounts set corresponding to a predetermined number of most-similar user accounts to the first user account; find, for a second user account associated with the second user selection, a third user accounts set corresponding to a predetermined number of most-similar user accounts to the first user account; and find an intersection of the first user accounts set, the second user account sets and the third user accounts set.

In embodiments, to generate a predicted channel add object in a group-based communication system based on the user-channel data structure, render a predicted channel add interface, and execute a channel invitation protocol, the apparatus is configured to determine a center-of-mass array.

BRIEF DESCRIPTION OF THE DRAWINGS

Figure 1:
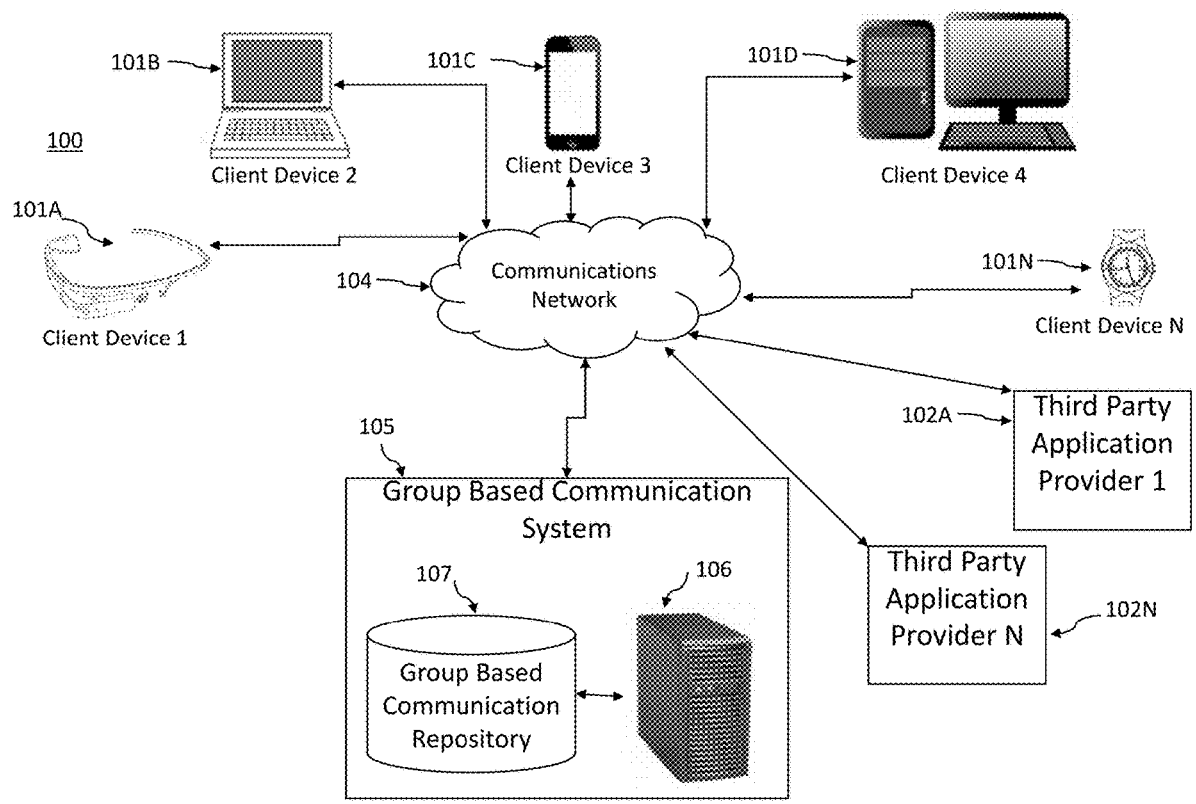
Figure 2:
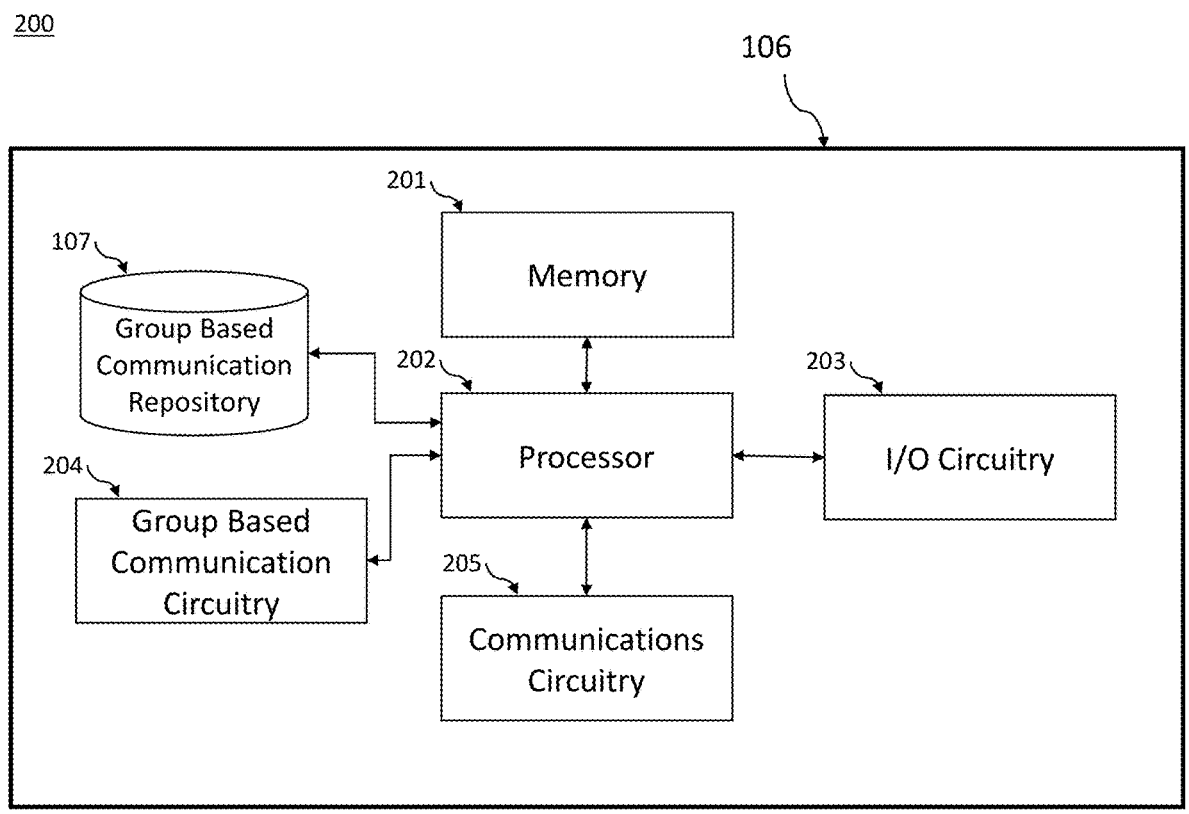
Figure 3:
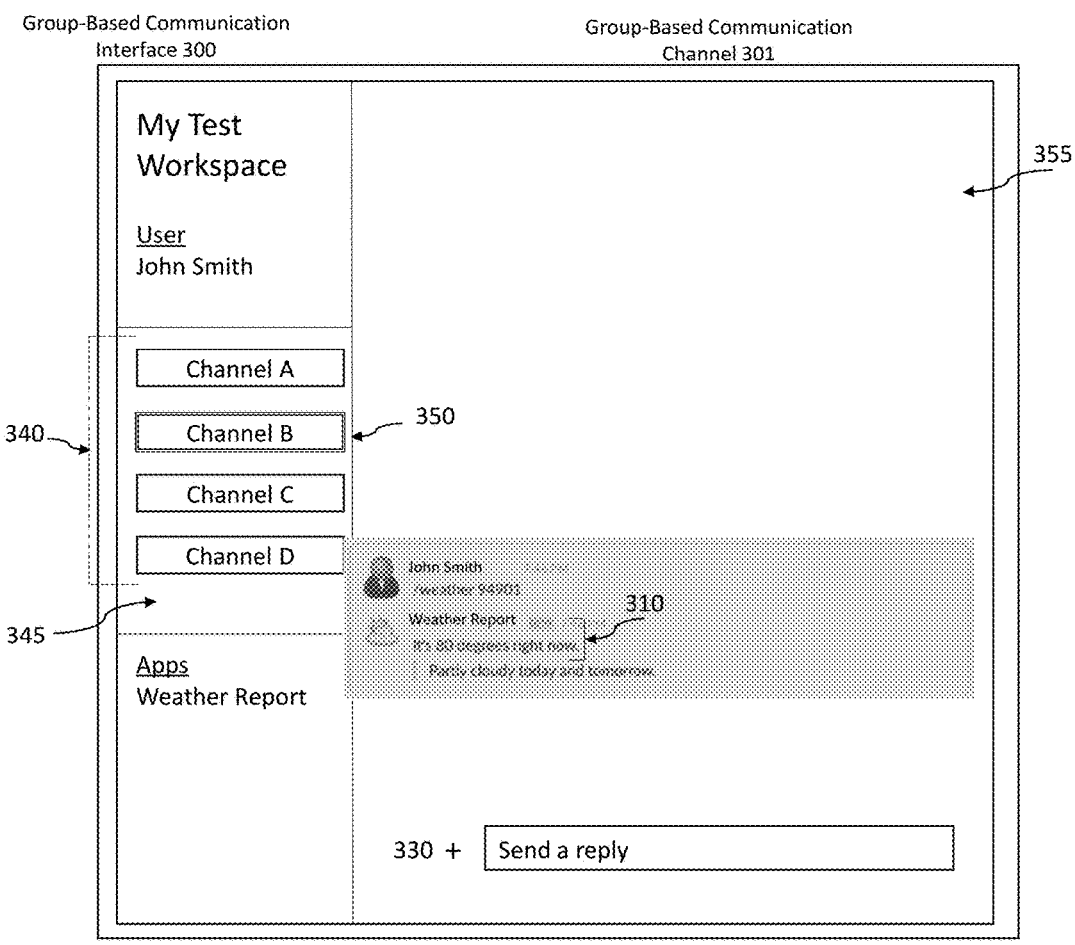
Figures 4A, 4B:
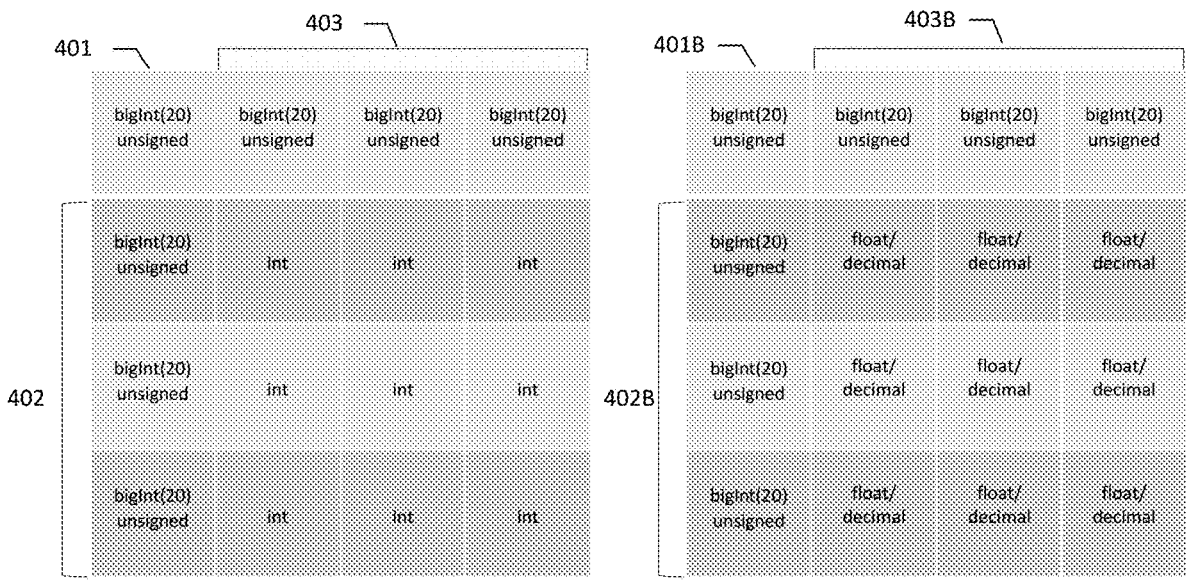
Figures 5A, 5B:
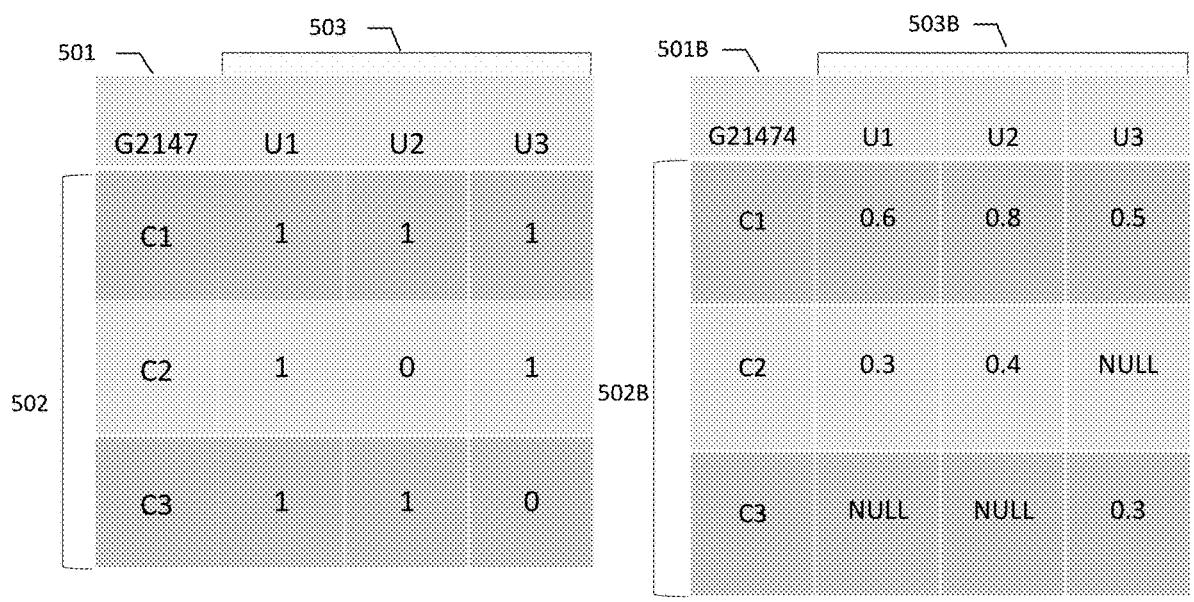
Figure 6:
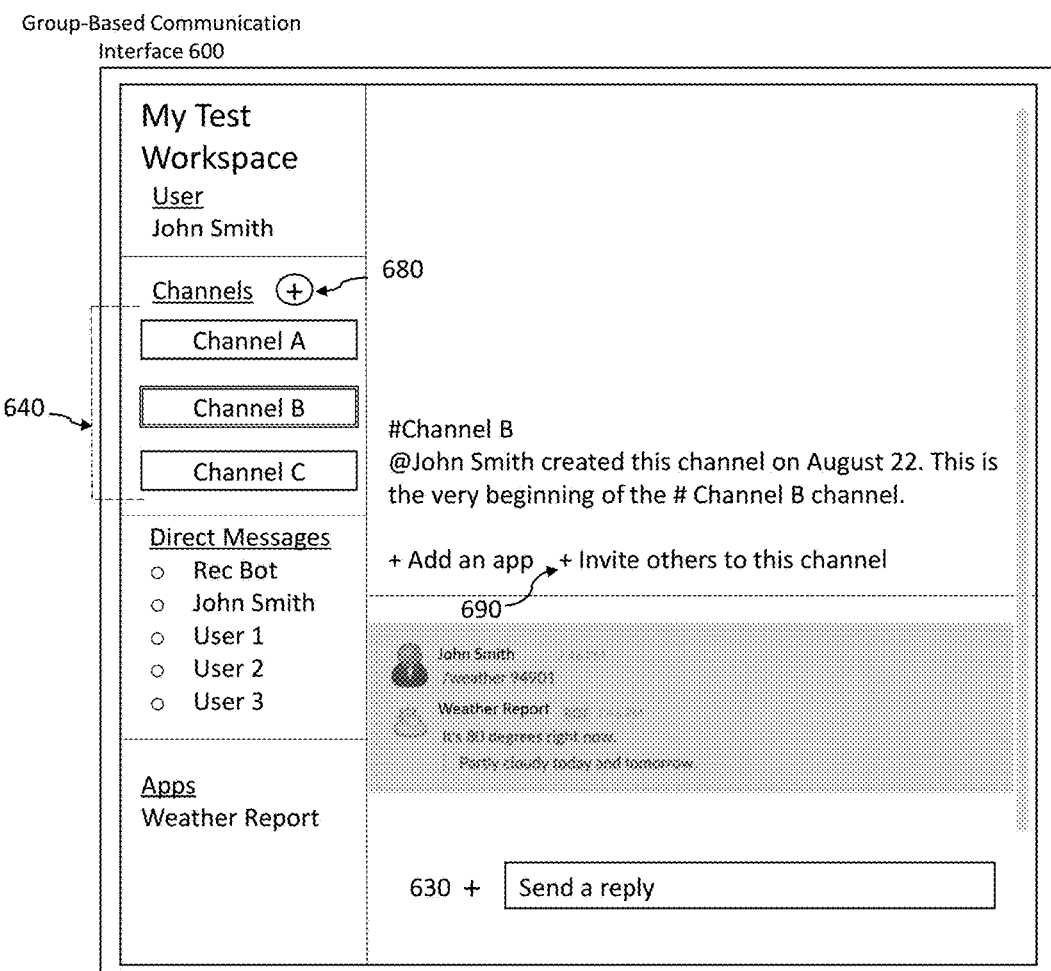
Figure 7:
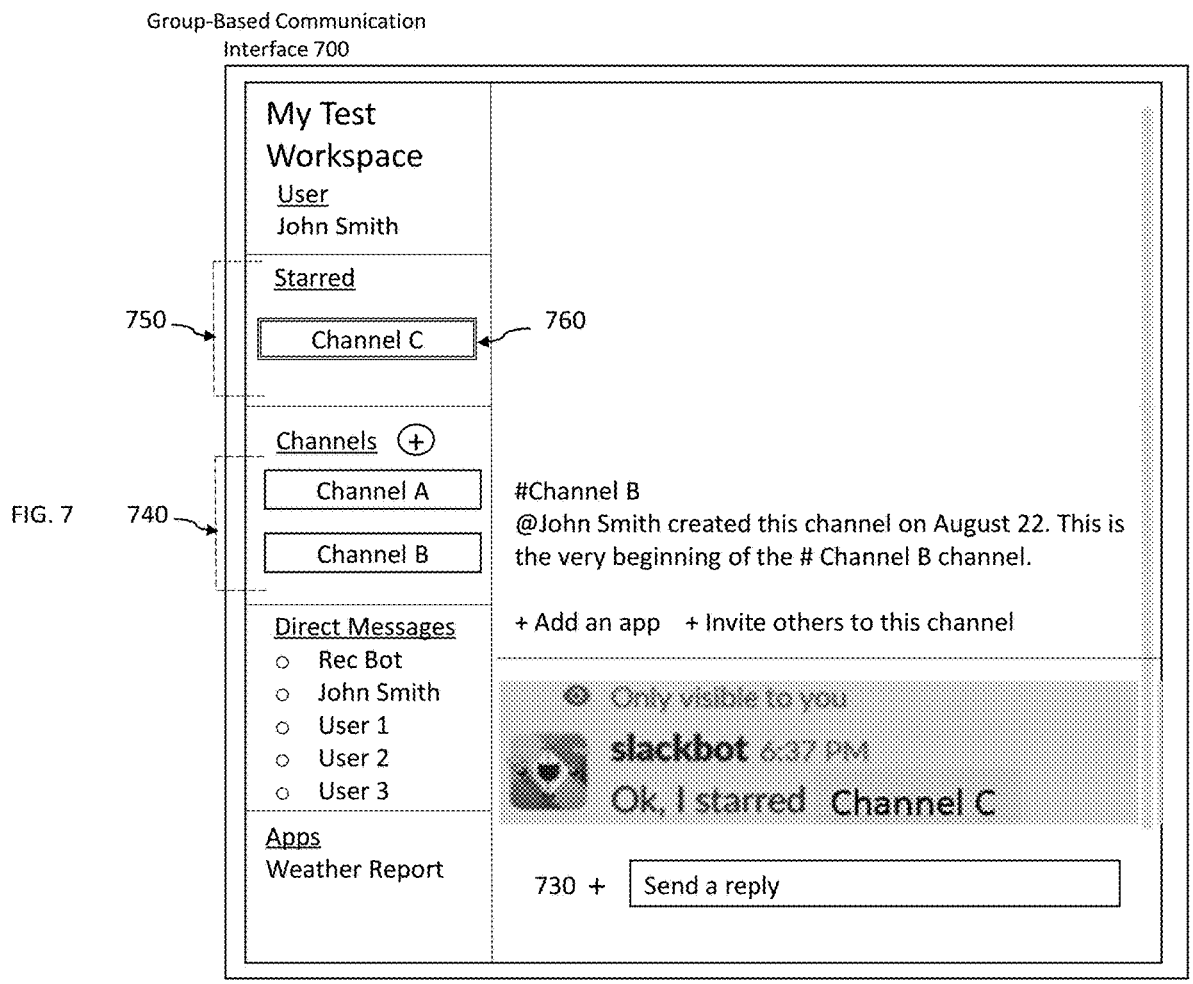
Figure 8:
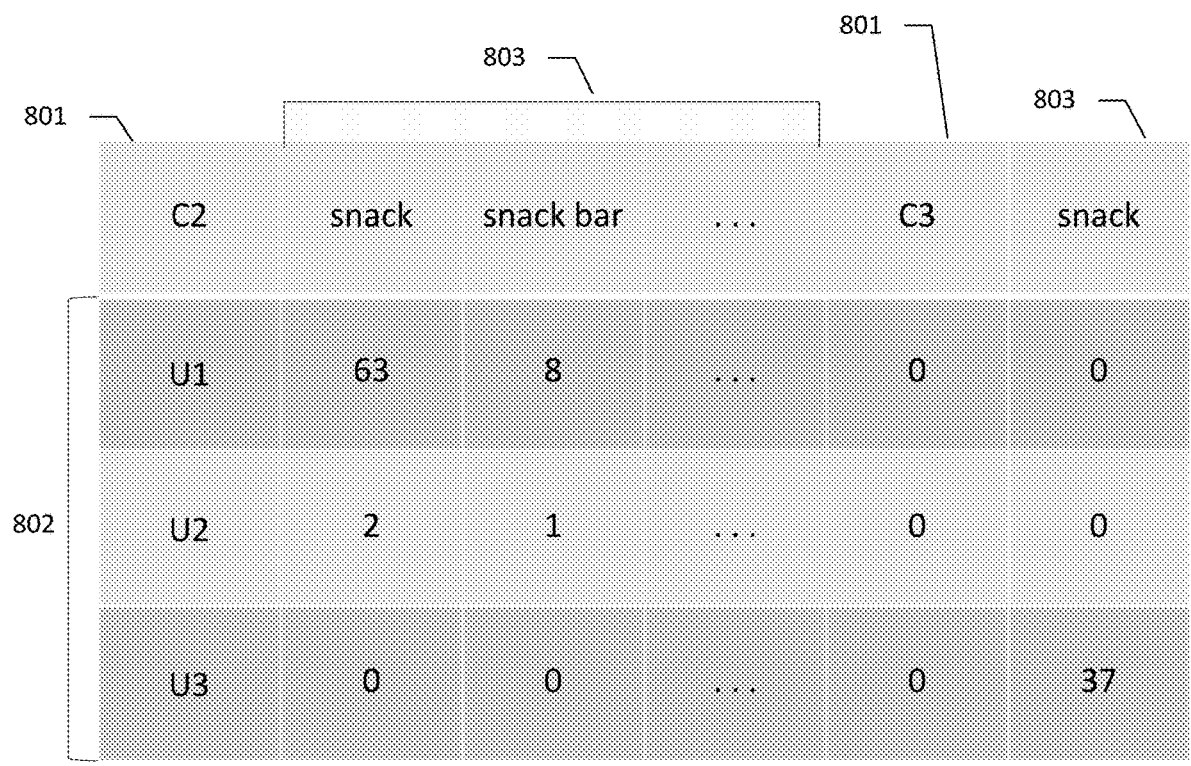
Figure 9:
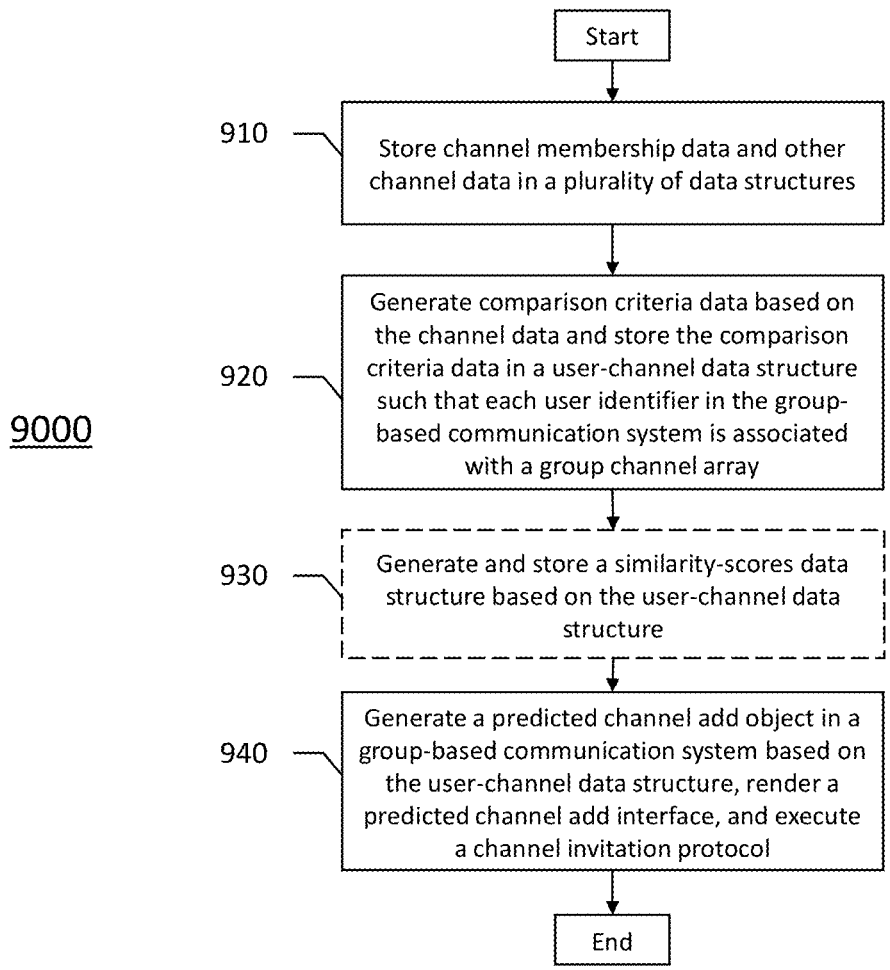
Figure 10A:
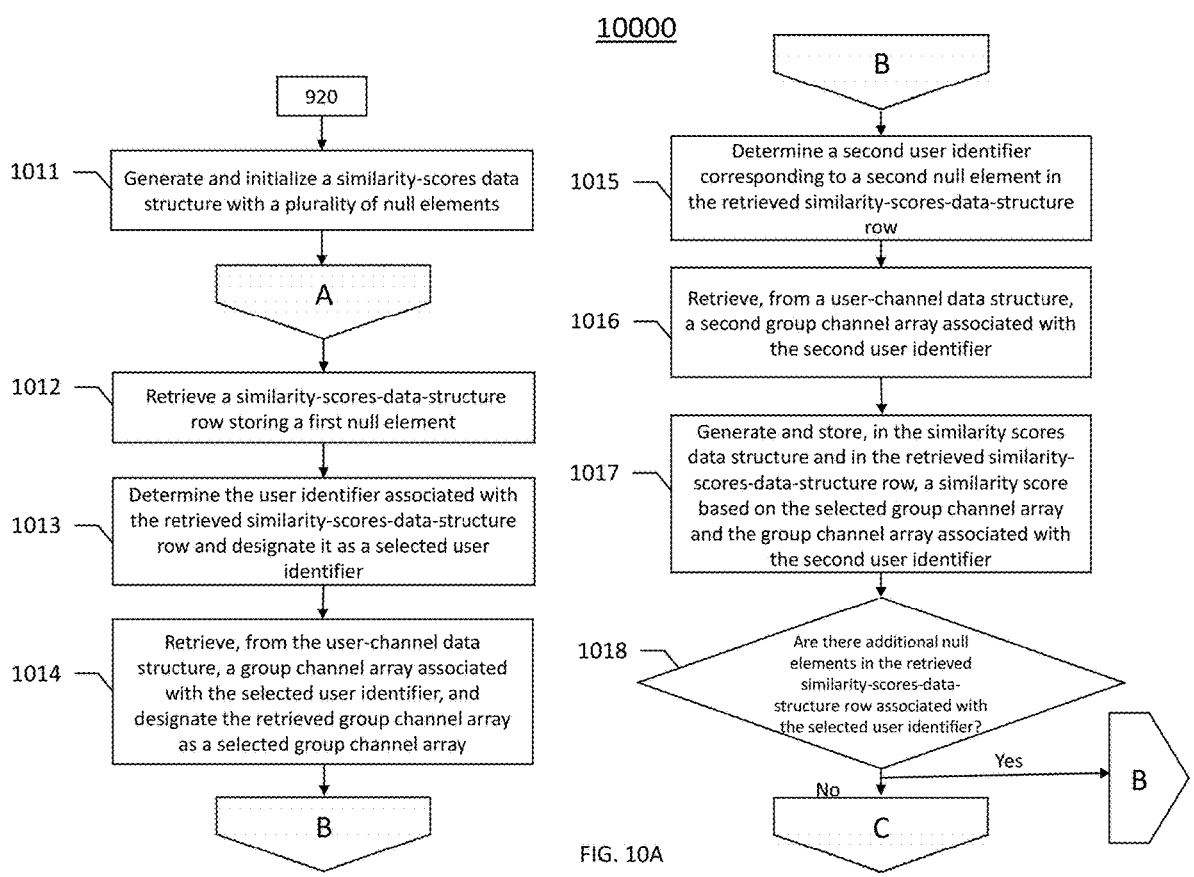
Figure 10B:
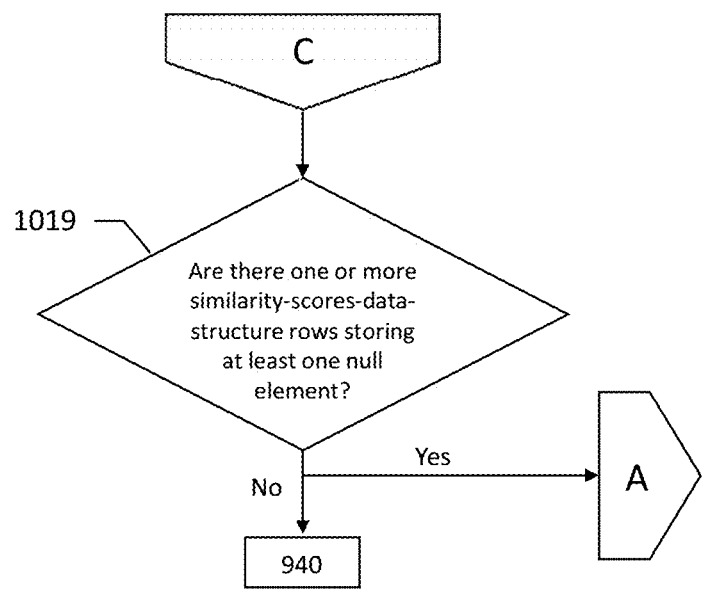
Figure 11:
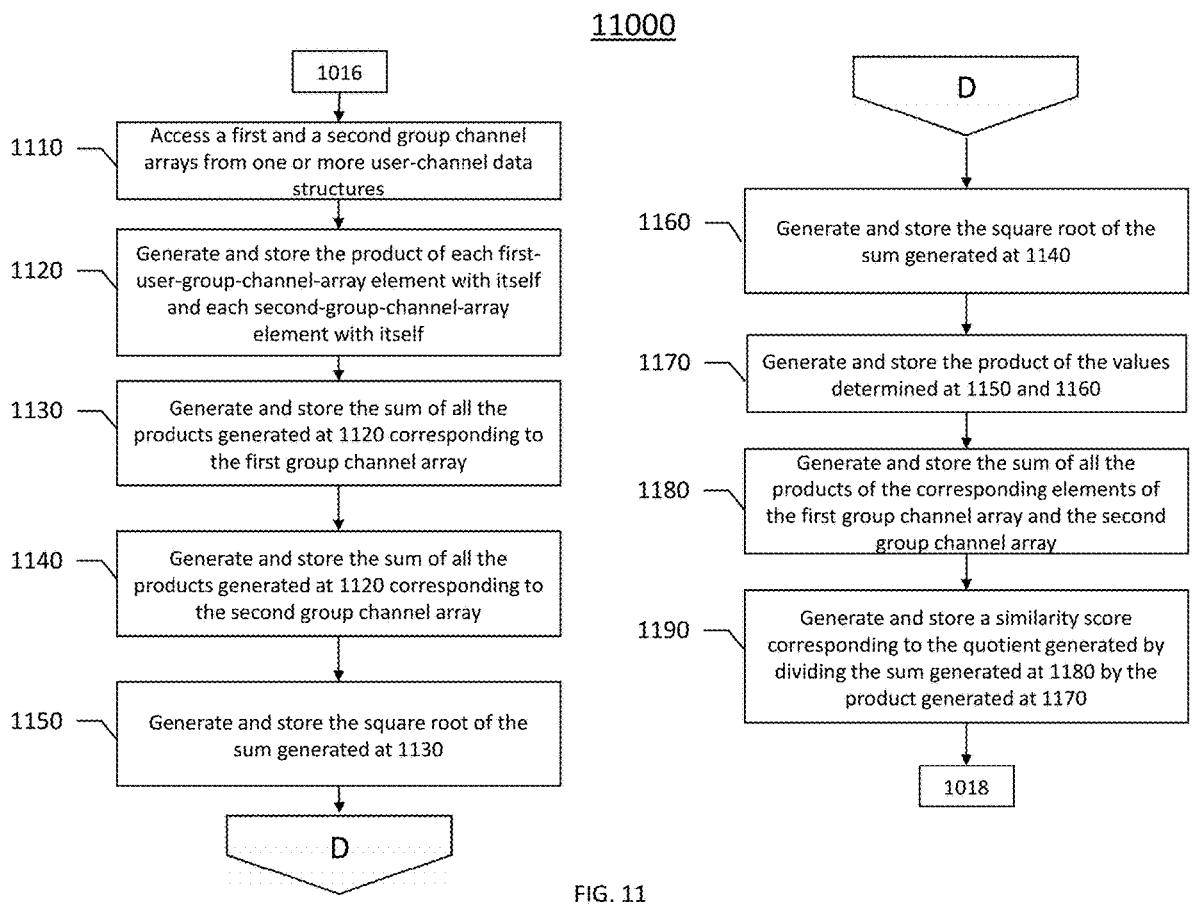
Figure 13A:
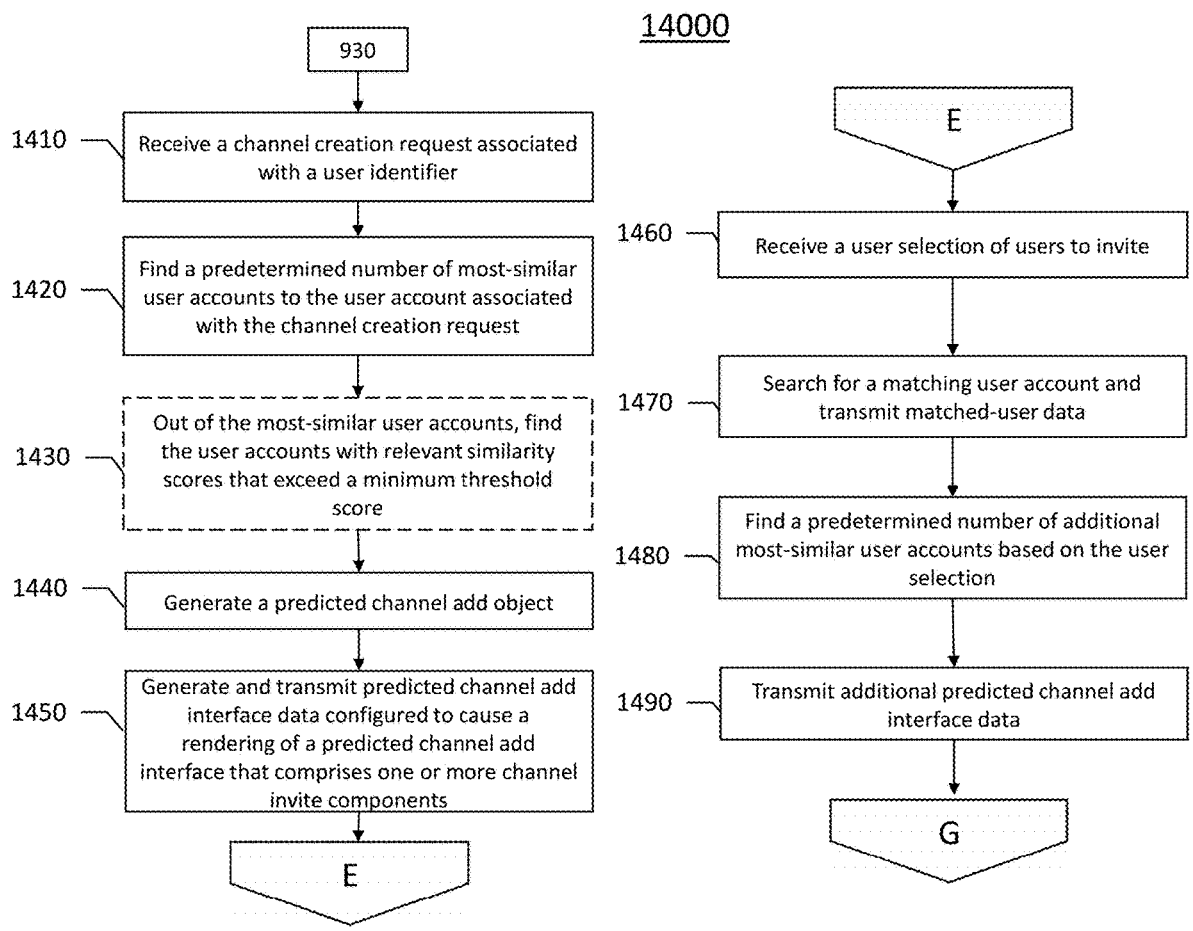
Figure 13B:
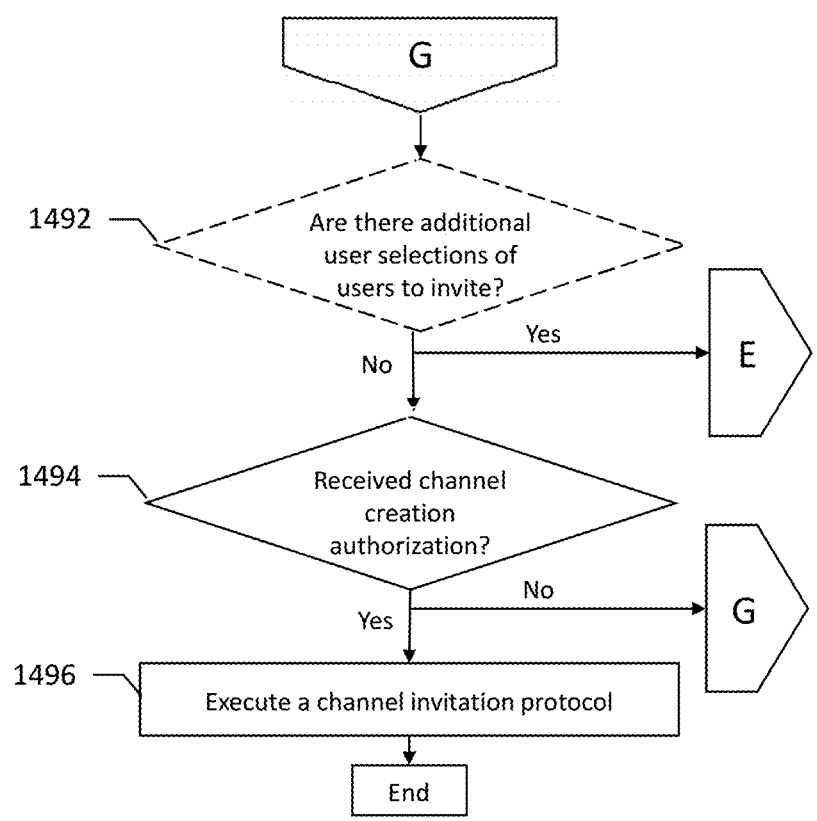
Figure 16:
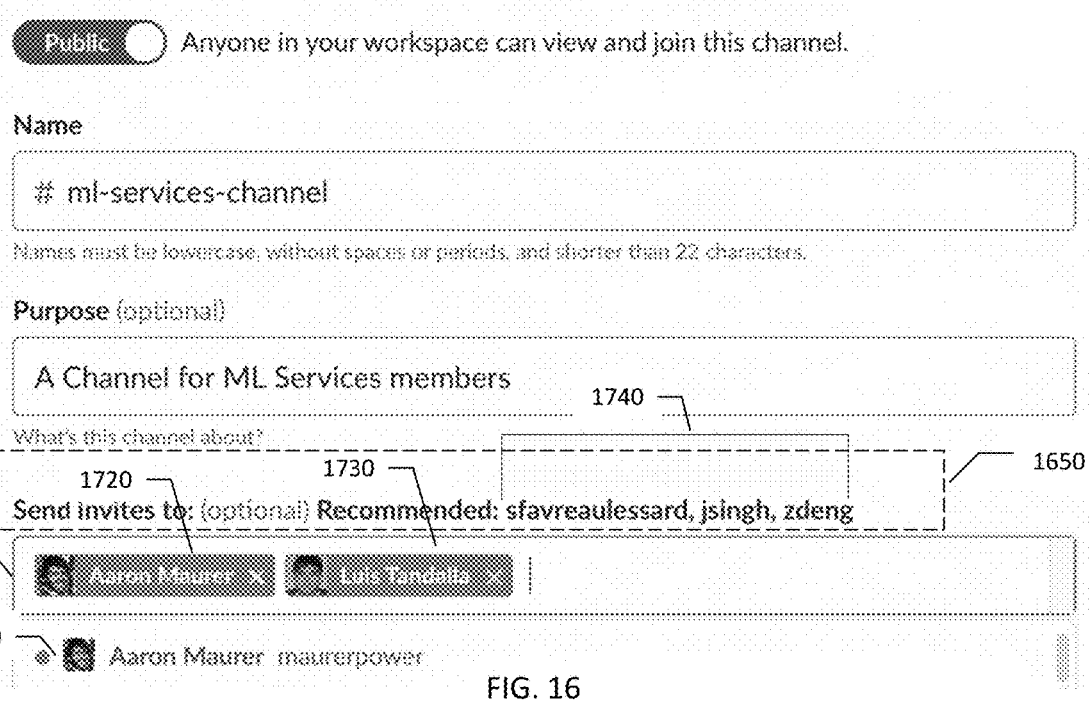
Figure 17:
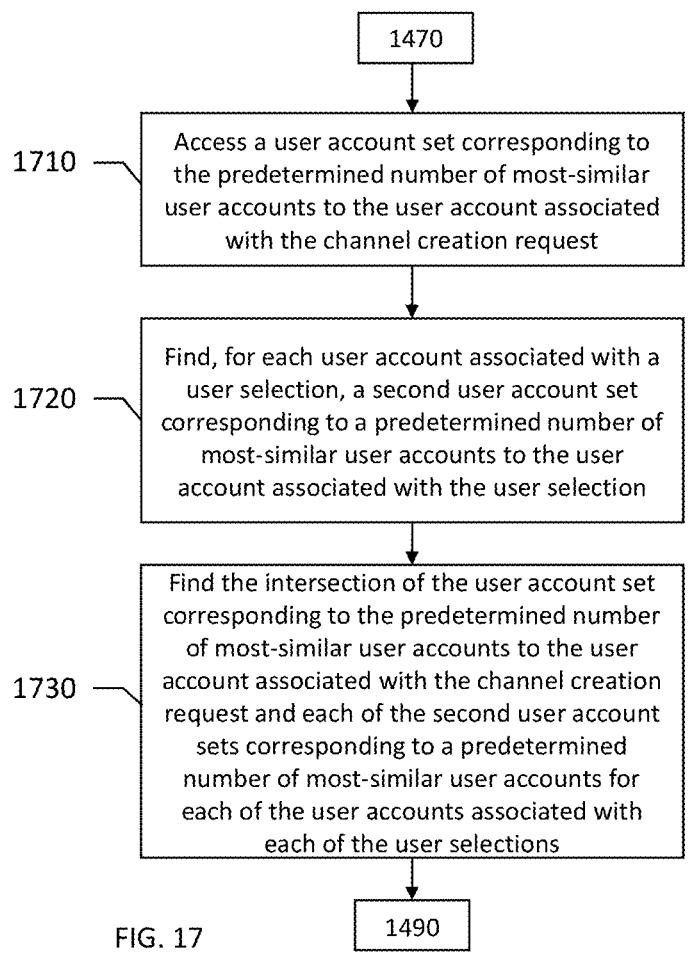
Figure 18:
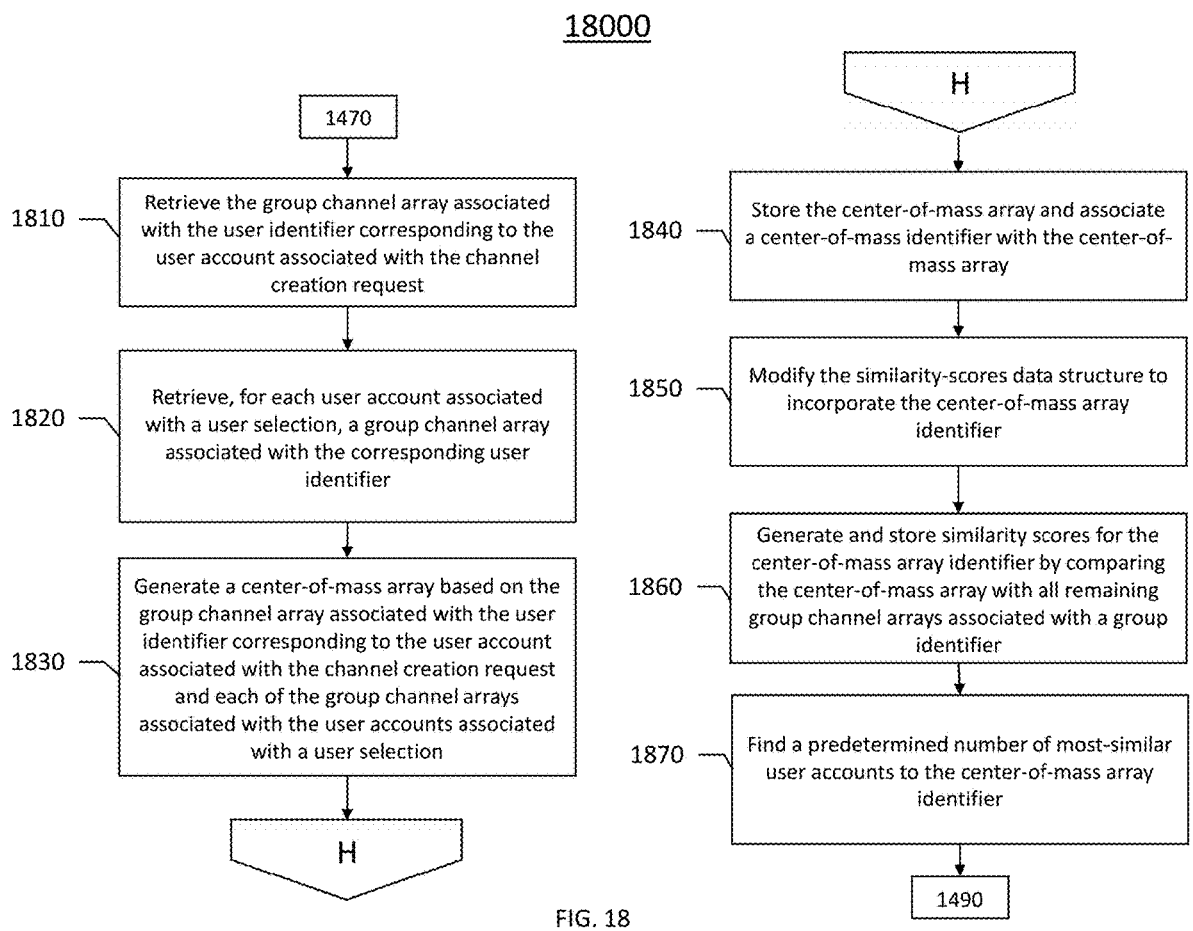
Figure 19:
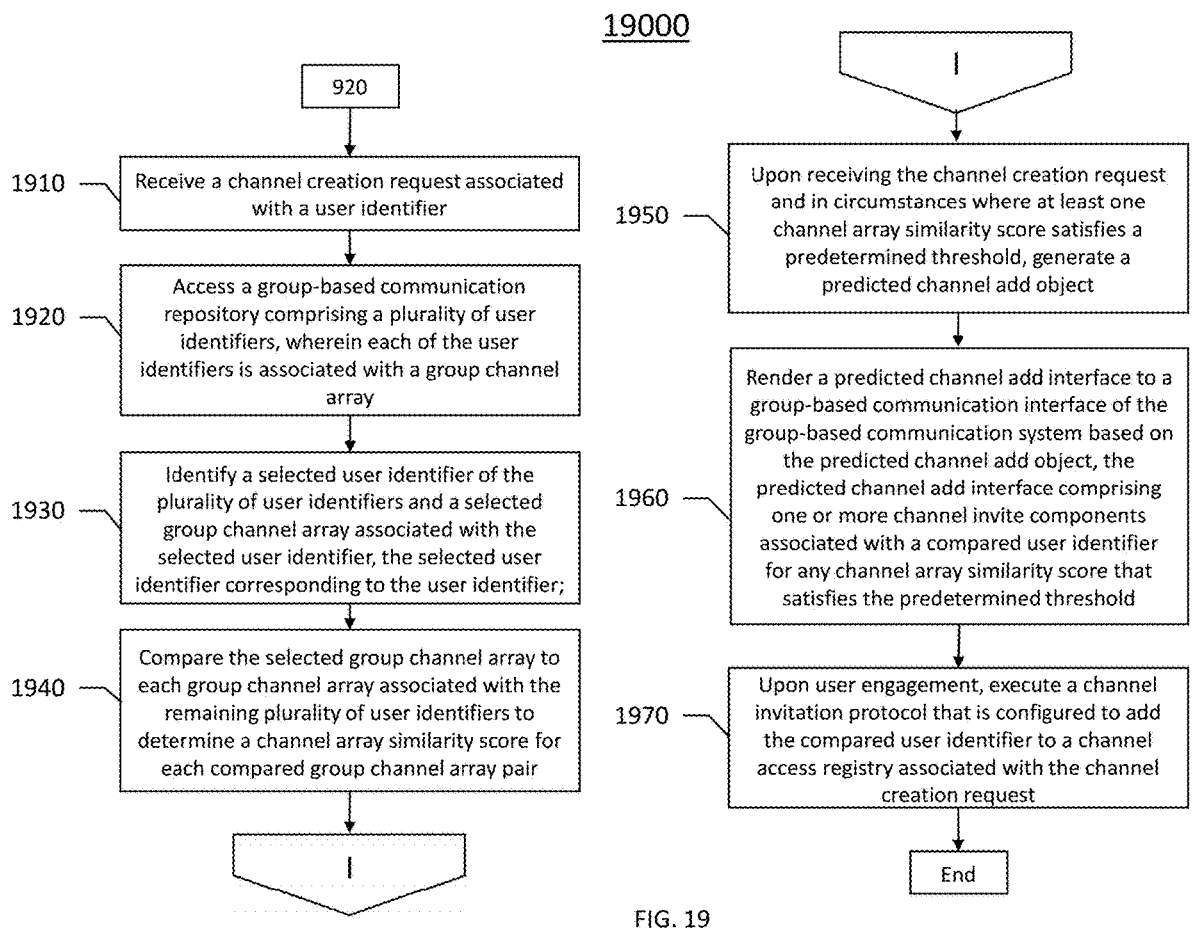
Figure 20:
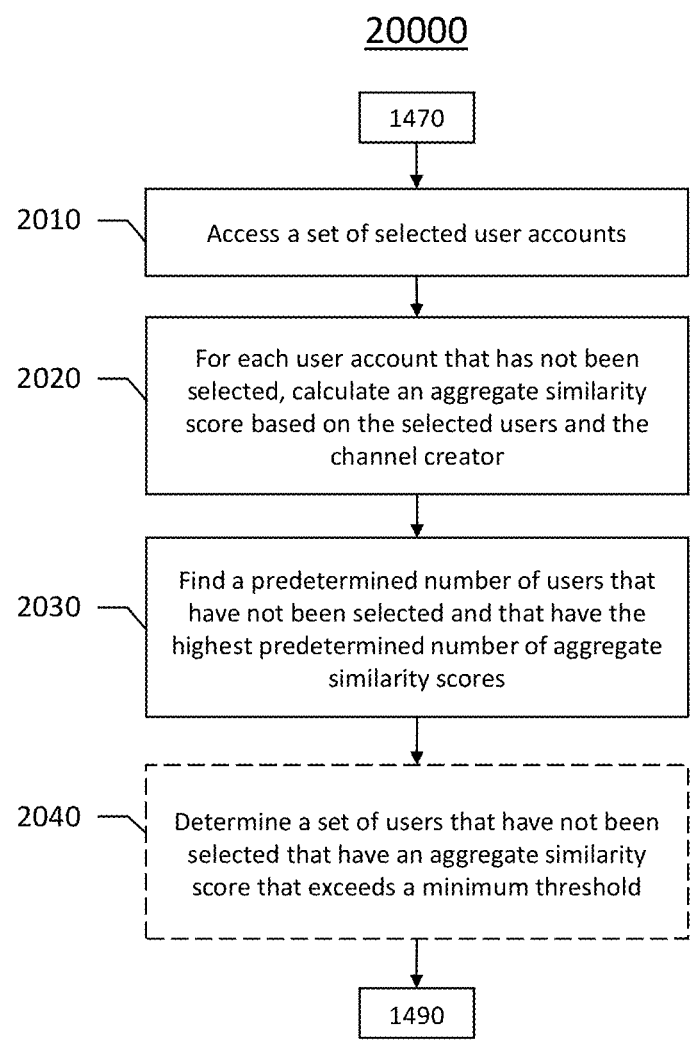

Having thus described the disclosure in general terms, reference will now be made to the accompanying drawings, which are not necessarily drawn to scale, and wherein:

FIG. 1 shows an example computing system within which embodiments of the present disclosure may operate;

FIG. 2 shows an exemplary apparatus for implementing embodiments of the present disclosure;

FIG. 3 shows an exemplary group-based communication interface for use with embodiments of the present disclosure;

FIGS. 4A-4B show an exemplary two-dimensional user-channel data structure, for use with embodiments of the present disclosure;

FIGS. 5A-5B show an exemplary two-dimensional user-channel data structure, for use with embodiments of the present disclosure;

FIG. 6 shows an exemplary group-based communication interface, for use with embodiments of the present disclosure;

FIG. 7 shows an exemplary group-based communication interface, for use with embodiments of the present disclosure;

FIG. 8 shows an exemplary user-channel data structure, for use with embodiments of the present disclosure;

FIG. 9 is a flowchart that embodies an exemplary method for generating and storing various data structures used for providing channel invite suggestions and for generating a predicted channel add object based on the various data structures, for use with embodiments of the present disclosure;

FIGS. 10A-10B show a flowchart that embodies an exemplary method for generating and storing a similarity-scores data structure based on a user-channel data structure, for use with embodiments of the present disclosure;

FIG. 11 is a flowchart that embodies an exemplary method for generating and storing a similarity score based on a first group channel array and a second group channel array, for use with embodiments of the present invention, for use with embodiments of the present disclosure;

Figures 12A, 12B:
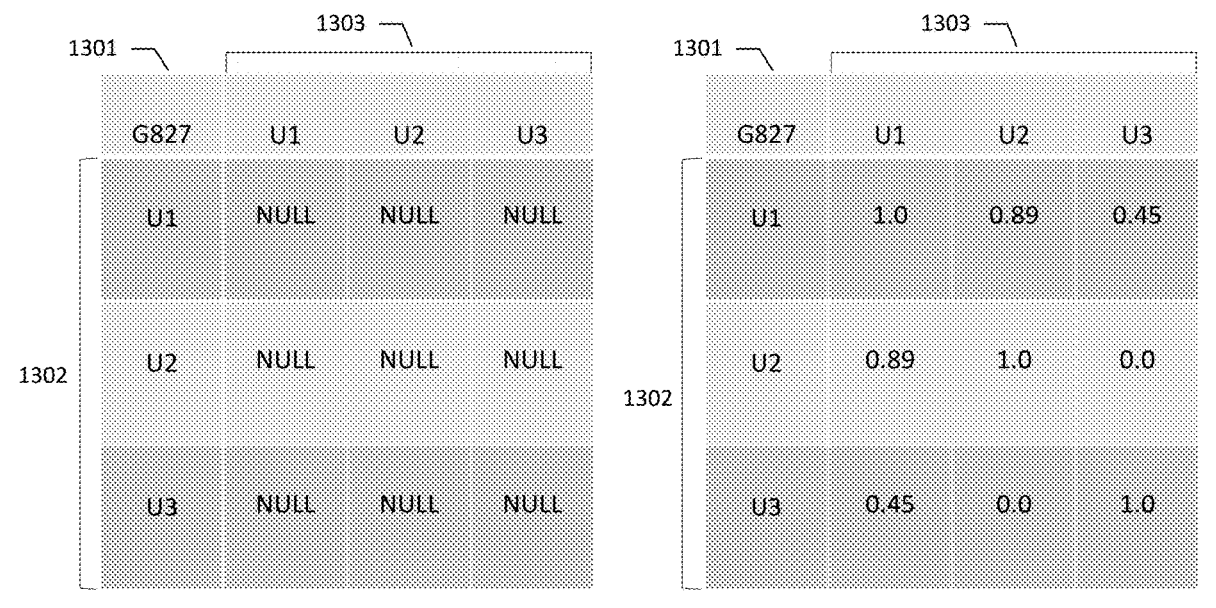

FIGS. 12A-12B show an exemplary similarity-scores data structure for use with embodiments of the present disclosure;

FIGS. 13A-13B are a flowchart of an exemplary method 14000 for generating a predicted channel add object in a group-based communication system based on a user-channel data structure, rendering a predicted channel add interface, and executing a channel invitation protocol, for use with embodiments of the present disclosure;

FIGS. 14-16 illustrate exemplary channel creation interfaces;

FIG. 17 is a flowchart of an exemplary method 17000 for finding a predetermined number of additional most-similar user accounts based on a user selection, for use with embodiments of the present disclosure;

FIG. 18 is a flowchart of an exemplary method 18000, which is an alternate embodiment of a method for finding a predetermined number of additional most-similar user accounts based on a user selection, for use with embodiments of the present disclosure;

FIG. 19 is a flowchart of an exemplary method 19000, which is an alternate embodiment of a method for generating a predicted channel add object in a group-based communication system based on the user-channel data structure, rendering a predicted channel add interface, and executing a channel invitation protocol, for use with embodiments of the present disclosure; and FIG. 20 is a flowchart of an exemplary method 20000, which is an alternate embodiment of a method for finding a predetermined number of additional most-similar user accounts based on a user selection, for use with embodiments of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers, client devices, and third party resources.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like. The users referred to herein access a group-based communication system using client devices. Each user of the group-based communication system is associated with at least one "group identifier". Each group identifier is a unique number. For example, in one embodiment, a group identifier may be stored as a 64 bit unsigned integer and represented externally (outside of memory) as a base-34 encoded string.

The terms "user profile," "user account," and "user account details" refer to information of a group-based communication system that is associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

As used herein, the term "user identifier" refers to one or more items of data by which a user and this user's corresponding user account may be identified within a group-based communication system. For example, a user identifier may comprise ASCII (American Standard Code for Information Interchange) text, a pointer, a memory address, and the like.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like. Group identifiers are used to distinguish group-based communication channels, messages, files, members, etc., of associated with one group-based communication interface from another group-based communication interface.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a timestamp that identifies the time of the message, a group identifier, and a group-based communication channel identifier. Each of the foregoing identifiers may comprise ASCII text, a pointer, a memory address, and the like.

A "sending user identifier" is associated with a collection of messages that are sent by a particular user (e.g., sent by a client device associated with the particular user, user identifier, or user profile). These messages may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access settings such that it is not generally accessible and/or searchable by other members of the group-based communication system (i.e., members associated with other group-based communication interfaces). For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication repository" refers to a location where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data is stored in a single remote location or a plurality of remote locations. Alternatively, in some embodiments, the group-based communication repository may be distributed over a plurality of remote storage locations only.

The term "user-channel data structure" refers to a collection of comparison criteria data values that capture relationships between users and group-based communication channels. The comparison criteria data values are formatted for storing, organizing, transforming and retrieving in the group-based communication repository for efficient utilization. The user-channel data structure is formatted, in certain embodiments, as a single matrix or data frame that captures all recorded or derived relationships, as reflected by the comparison criteria data, between users and group-based communication channels which comprise the comparison criteria data. The user-channel data structure is formatted, in other embodiments, as a collection of matrices or data frames that, in the aggregate, capture all recorded or derived relationships that comprise the comparison criteria data. In at least one embodiment, each row of a matrix that comprises a user-channel data structure corresponds to a group-based communication channel (via a channel identifier) and each column corresponds to a user (via a user identifier). Additionally, in embodiments where more than one two-dimensional matrix or data frame is necessary to implement a user-channel data structure, a multi-dimensional data structure may instead be employed. In some embodiments, the comparison criteria data that is stored in a user-channel data structure captures membership information (i.e. whether a user is a member of a specific group-based communication channel), starring information (i.e. whether a user has starred or indicated a preference for a specific group-based communication channel), a level of user activity (i.e. the frequency with which a user reads and/or posts messages in specific group-based communication channels), channel access weight parameters, word usage (i.e. the frequency with which a user mentions specific words in a group-based communication channel), or the like.

The term "comparison criteria data" refers to data values that capture relationships between users and group-based communication channels and which the group-based communication system uses to compare users for purposes of generating a similarity score between users. The comparison criteria data comprises data that is either selected or derived from user-channel data that was recorded and stored during regular operations of the group-based communication system. The user-channel data comprises information that captures membership data (whether certain users belong to a channel), channel starring data (whether certain users have "starred" a channel), user activity within a channel (e.g. reading messages, posting messages, accessing the channel, uploading files, etc.), and any other relationship between users and channels. The group-based communication system uses the comparison criteria data to compare users (based on the comparison criteria data) and determine a similarity score for these compared users. For example, in certain embodiments, the comparison criteria data comprises membership data and channel access weight parameters derived from the recorded information that captures user activity within a channel. In these embodiments, a similarity score would thus reflect the similarity between two users based on the membership data and channel access weight parameters. In other embodiments, the comparison criteria data may also or alternatively include channel starring data and various embodiments of a channel access weight parameter, and similarity scores would accordingly reflect the similarity between two users based on these criteria. In embodiments, the comparison criteria data can comprise any combination or variation of the user-channel data and any data that is derivable therefrom.

The term "channel access weight parameters" refers to data values that capture the degree to which a user interacts with or accesses a particular group-based communication channel. In at least one embodiment, each channel access weight parameter is the result of a function that considers one or more elements that reflect user activity or interactions with a group-based communication channel. For example, in at least one embodiment, each channel access weight parameter is the result of a weight function that gives some elements more influence on the result than other elements in the weight function. Each channel access weight parameter corresponds to a group-based communication channel and a user identifier that corresponds to a user. The channel access weight parameters comprise information regarding a level of activity of a user in a group-based communication channel as determined by the number of posted messages, the number of times that a user reads messages, the number of times a user accesses a group-based communication channel, or the like.

The term "user-channel matrix" refers to a two-dimensional matrix that stores values that capture relationships between users and group-based communication channels. One or more user-channel matrix comprise, in the aggregate, a user-channel data structure. Thus each row of a user-channel corresponds to a group-based communication channel (via a channel identifier) and each column corresponds to a user (via a user identifier). Each row and column also store user-comparison criteria data values that capture membership information (i.e. whether a user is a member of a specific group-based communication channel), starring information (i.e. whether a user has starred or indicated a preference for a specific group-based communication channel), a level of activity (i.e. the frequency with which a user reads and/or posts messages in specific group-based communication channels), channel access weight parameters, channel word count data, and/or the like.

The term "group channel array" refers to a data structure formatted as an array that comprises a plurality of values that capture relationships between users and group-based communication channels. In at least one embodiment, the group channel array is generated by retrieving a column or row from a user-channel matrix. Thus, each element of the group channel array represents a comparison criteria data value stored in the user-channel matrix and associated with a user identifier and a group-based communication channel (via a channel identifier).

The term "user-channel access recency data" refers to data values that capture information regarding how recently a user associated with a user identifier has accessed a specific group-based communication channel. Each data value comprising the user-channel access recency data is associated with a user to indicate the recency of said user's interactions with a specific group-based communication channel. Thus, the user-channel access recency data is based on user activity within a group-based communication channel. For example, the user-channel access recency data may utilize time stamps associated with events representing user activity within a group-based communication channel such as user message posts, message reads, file uploads, accessing a channel and the like. Regarding message posts, in at least some embodiments, the time stamps are determinable from a group-based communication message corpus, channel message corpus, or thread message corpus, which will be further discussed below. The time stamp associated with message posts may, in other embodiments, be retrievable and determinable from the group-based communication object that comprises the group-based communication message itself. Regarding an event representing a user accessing a channel, the time stamp is determined based on channel access events recorded by the group-based communication system such as events logged when receiving user inputs (such as mouse clicks, finger taps, voice commands, a series of keystrokes) comprising an indication that a user has selected a group-based communication channel for viewing. Regarding an event representing message reads, the time stamp is determined based on events recorded by the group-based communication system such as events logged when receiving user inputs comprising an indication that a user has moved a cursor mark or a scrolling element while interacting with a group-based communication channel. Each of these recorded events have a time stamp associated with them from which the group-based communication system may derive the user-channel access recency data. In some instances, the user-channel access recency data comprises a score that has a higher value (e.g., 0.3) when a user has accessed a group-based communication channel more recently relative to other users who have accessed the group-based communication channel less recently. However, the score may operate such that it takes a lower value when the user has accessed the group-based communication channel more recently relative to other users.

The term "user-channel access frequency data" refers to data values that capture information regarding the rate at which users access a specific group-based communication channel. Each data value comprising the user-channel access frequency data is associated with a user to indicate the rate with which said user accesses a specific group-based communication channel. The user-channel frequency is based on user activity within a group-based communication channel. In some embodiments, the user-channel frequency data may represent the number of times that a user has accessed a group-based communication channel over a particular time period (e.g. over the last 28 days). However, in other embodiments, the user-channel frequency data may simply track, such as via a counter, the number of times that a user has accessed a group-based communication channel without regards to a particular time period. In some embodiments, the user-channel access frequency data is determined based on other data values such as user-channel write frequency data, user-channel read frequency data, user-channel access recency data, and/or the like. An example approach to channel use frequency, channel access recency, etc., is disclosed in commonly owned U.S. patent application Ser. No. 15/958,484 titled "METHOD, APPARATUS, AND COMPUTER PROGRAM PRODUCT FOR OUTPUTTING IMPROVED AUTOSUGGESTIONS IN A GROUP-BASED COMMUNICATION SYSTEM," filed Apr. 20, 2018, the contents of which are incorporated herein by reference in their entity. Other variations of the user-channel access frequency data are also contemplated by this disclosure and definition as will be apparent to one of ordinary skill in the art.

The term "user-channel read frequency data" refers to data values that capture information regarding the rate at which users read messages posted in a particular group-based communication channel. Each data value comprising the user-channel read frequency data is associated with a user to indicate the rate at which said user reads posted messages. For example, in at least one embodiment, the group-based communication system records events such as user inputs that comprise an indication that a user has moved a cursor mark or a scrolling element while interacting with a group-based communication channel. The group-based communication system may thus analyze these recorded events to determine the number of times a user has read messages in a group-based communication channel. Thus, the user-channel read frequency data is generated based on user activity within a group-based communication channel. In some embodiments, the user-channel read frequency data may record the number of times that each user has accessed a group-based communication channel over a particular time period for purposes of reading messages posted in a particular group-based communication channel. However, in other embodiments, the user-channel frequency data may simply track, such as via a counter, the number of times that each user has accessed a group-based communication channel. Other variations of the user-channel read frequency data are also contemplated by this disclosure and definition.

The term "user-channel write frequency data" refers to data values that capture information that quantifies the number of times users post messages in group-based communication channels. Each data value comprising the user-channel write frequency data is associated with a user to quantify the number of times said user posts messages. The user-channel write frequency data is determinable from a group-based communication message corpus, channel message corpus, or a thread message corpus, which will be further discussed below. In other embodiments, the user-channel frequency data is determined from the group-based communication objects that comprise group-based communication messages themselves. In at least one embodiment, each data value comprising the user-channel write frequency data is a counter that tracks the number of times that a specific user has posted a message in a group-based communication channel. In other embodiments, the user-channel frequency data may be stored as a normalized number of times that a specific user has posted a message in a group-based communication channel. Other variations of the user-channel write frequency data are also contemplated by this disclosure and definition.

The term "channel word count data" refers to data values that capture information that quantifies the number of times a user has mentioned certain words in messages posted in group-based communication channels. Each data value comprising the channel word count data is associated with a user and a word in order to quantify the number of times said user has posted messages mentioning said word. The channel word count data is determinable from a group-based communication message corpus, channel message corpus, or a thread message corpus, which will be further discussed below. In other embodiments, the channel word count data is determined from the group-based communication objects that comprise group-based communication messages themselves. In at least one embodiment, each data value comprising the channel word count data is a counter that tracks the number of times that a specific user has posted a specific word in a group-based communication channel. The channel word count data may track all the words in a given dictionary for each user and each group-based communication channel in the group-based communication system. In other embodiments, the channel word count data is stored as a normalized number that comprises a normalized version of the number of times that a specific user has posted a specific word in a group-based communication channel.

The term "channel invitation protocol" refers to a procedure for inviting and adding a user to a group-based communication channel. For example, in one embodiment, a channel invitation protocol comprises sending to a user, by a group-based communication system, a message comprising an interactive component that enables a user to provide inputs that cause the group-based communication system to cause the user to join a group-based communication channel. A channel invitation protocol thus enables a user identifier to be added to a channel access registry in order to indicate to the group-based communication system that the user associated with this user identifier should have access to a group-based communication channel. Additional variations of a channel invitation protocol are also contemplated by this disclosure and definition.

The term "compared user identifier" refers to one or more items of data that uniquely identify a user that, in turn, has one or more similarity scores associated with it. Thus, a compared user identifier may comprise ASCII text, a pointer, a memory address, and the like.

The term "channel access registry" refers to one or more items of data that record for each group-based communication channel the set of users that belong to and have access to this group-based communication channel. The channel access registry, in one embodiment, is stored in the group-based communication repository as a separate table that is dedicated to storing channel membership information. The channel access registry, in other embodiments, forms part of a user-channel matrix that is stored in the group-based communication repository and that maps channel membership information in addition to other relationships between users and group-based communication channels. The group-based communication system uses the values stored in the channel access registry to determine which group-based communication channels to render in a display and make available to a user via a group-based communication interface. The group-based communication system may access the channel access registry, for example shortly after a user logs into the group-based communication system, in order to determine the group-based communication channels to render and make accessible to the user after log-in.

The term "compared group channel array pair" refers to two group channel arrays corresponding to two user identifiers that are compared with each other for the purposes of generating a similarity score. By comparing all group channel arrays in a user-channel data structure with each other, a group-based communication system generates all values necessary for a complete similarity-scores data structure, which is a term further discussed in this disclosure.

The term "channel creation request" refers to an electrically generated digital object that indicates that a user has provided an input comprising a request to create a group-based communication channel. A channel creation request may be represented via a temporary code that notifies a recipient that a user has made the request. To provide further context, a channel creation request is generated in response to a user interaction with a group-based communication interface presented on a display screen of a client device. A user causes the client device to generate a channel creation request by interacting with, for example, a specific channel-creation actuator button that forms part of the group-based communication interface.

The term "similarity-scores data structure" refers to a collection of data values that capture a level of similarity between users of the group-based communication system. The data values are formatted for storing, organizing, transforming and retrieving in the group-based communication repository for efficient utilization. In at least one embodiment, the similarity-scores data structure is formatted as a two-dimensional matrix where each row and column of a corresponds to a user identifier. Even though the similarity-scores data structure may be embodied as a matrix or data frame, the similarity-scores data structure may also be embodied as a plurality of arrays or vectors, where each array or vector may correspond to a user identifier. In certain embodiments, a group-based communication server determines the similarity scores by manipulating and transforming comparison criteria data (as stored in one or more user-channel data matrices) corresponding to two user accounts (associated with their respective user identifiers). The similarity scores may be based on a cosine similarity, Euclidean similarity, Pearson correlation, or the like. In at least one embodiment, the similarity-scores data structure is further pruned such that only the top K scores are stored for each user.

The term "similarity-scores-data-structure row" refers to a row of a similarity-scores data structure. Consequently, a similarity-scores-data-structure row comprises a plurality of similarity scores associated with a user (via a user identifier).

The term "channel invite components" refers to an interactive element that enables user selections that cause the execution of a channel invitation protocol that is configured to invite a user to join a group-based communication channel. In some embodiments, each channel invite component comprises a symbol or graphic representation on a display device that is selectable via a user input such as a mouse click, finger tap, series of keyboard strokes, or the like. The channel invite component may comprise an interactive element that includes a user name as well as an icon or image associated with said user name which are rendered on a display screen. Additional variations of the channel invite components are also contemplated by this disclosure and definition.

The term "predicted channel add object" refers to an electronically generated digital object that results from a predictive analysis implemented by a group-based communication system and which the group-based communication system utilizes to generate a predicted channel add interface and any corresponding channel invite components. The group-based communication system generates one or more predicted channel add objects as a result of performing computational analysis of collected data. In at least one embodiment, the predictive analysis involves the generation and use of similarity scores that result from comparing user-channel data matrices associated with users (and their respective user identifiers) of the group-based communication system. Thus, the collected data may capture information regarding user activity such as reading and posting messages or words in group-based communication channels. The collected data may also comprise membership data and channel access weight parameters.

The term "predicted channel add interface" refers to a modal or dedicated interface component that is rendered to a group-based communication interface and is configured to present one or more channel invite components. The predicted channel add interface is generated based on data and instructions provided by the predicted channel add object. The predicted channel add interface is presented on a display screen. The predicted channel add interface also provides a means for a user of the client device to provide a series of inputs that comprise a channel invite such as by interacting with the rendered channel invite components. In this manner, the predicted channel add interface enables a user to initiate a channel invitation protocol.

The term "group-based communication object" refers to a collection of data and instructions that represent an item or resource of the group-based communication system. In some embodiments, third party applications are permitted to perform actions on one or more group-based communication objects. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, metadata associated with group-based communication messages such as an author identifiers, a post timestamp, a channel identifier, user identifiers of users with access rights to the group-based communication message, group-based communication messages and the like.

The term "group-based communication message corpus" refers to a collection of communication messages in one or more workspaces (workspaces are also referred to herein as group-based communication interfaces). In some embodiments, group-based communication message corpus are constructed by combining multiple channel message corpuses. In some embodiments, a channel message corpus is constructed by periodically collecting group-based communication messages based on time stamp data. This group-based communication message corpus thus stores the group-based communication messages and their respective timestamps. In some embodiments, a channel message corpus is constructed by collecting group-based communication messages after a defined number of messages with identical group-based communication channel identifier or thread identifier is received. In some embodiments, a channel message corpus is constructed by collecting group-based communication messages after receiving a request (such as a user request) to construct a channel message corpus. In some embodiments, a channel message corpus is constructed by collecting group-based communication messages in a thread communication that initiated in a channel. In some embodiments, a channel message corpus is constructed in accordance with other construction criteria defined by a message corpus construction learning model.

The term "channel message corpus" refers to a collection of communication messages that are configured for rendering in a group-based communication channel. In some embodiments, channel message corpus are constructed based on a pre-defined trigger. In some embodiments, a channel message corpus is constructed by periodically collecting group-based communication messages based on time stamp data and group-based communication channel identifiers. This channel message corpus thus stores the group-based communication messages and their respective timestamps. In some embodiments, a channel message corpus is constructed by collecting group-based communication messages having identical group-based communication channel identifiers or thread identifiers. In some embodiments, a channel message corpus is constructed by collecting group-based communication messages after receiving a request (such as a user request) to construct a channel message corpus. In some embodiments, a channel message corpus is constructed by collecting group-based communication messages in a thread communication that initiated in a channel. In some embodiments, a channel message corpus is constructed in accordance with other construction criteria defined by a message corpus construction learning model.

The term "thread message corpus" refers to a collection of communication messages in a thread communication. The thread communication may be initiated in a group-based communication channel. In some embodiments, thread message corpus are constructed based on a pre-defined trigger. In some embodiments, a thread message corpus is constructed by periodically collecting group-based communication messages based on time stamp data and thread identifiers. This thread message corpus thus stores the group-based communication messages and their respective timestamps. In some embodiments, a thread message corpus is constructed by collecting group-based communication messages after a defined number of messages with identical thread identifier is received. In some embodiments, a thread message corpus is constructed by collecting group-based communication messages after receiving a request (such as a user request) to construct a thread message corpus. In some embodiments, a thread message corpus is constructed in accordance with other construction criteria defined by a message corpus construction learning model.

The term "workspace" refers to a group of users and a set of group-based communication objects all of which are associated with a common group identifier. The term "workspace" may be used interchangeable with the term "group-based communication interface". In various embodiments, users sharing a group identifier also share group-based communication objects. In other words, users sharing a common group identifier that is also shared by a set of group-based communication objects may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

The term "channel invite suggestions" refers to rendered suggestions to invite other users to join a group-based communication channel. In at least one embodiment, a group-based communication server determines user accounts (i.e., user account identifiers) to include in channel invite suggestions and transmits such user accounts to a client device for rendering. In one embodiment, the client device provides the channel invite suggestions via a rendered channel creation interface. In other embodiments, the client device provides the channel invite suggestions via a rendered predicted channel add interface that was generated based on a predicted channel add object.

In some embodiments, the group-based communication server determines the user accounts to include in channel invite suggestions by generating, retrieving, and manipulating a user-channel data structure and a similarity-scores data structure. For example, in at least one embodiment, the group-based communication server determines the user accounts to include in channel invite suggestions by finding the K-most-similar user accounts to a reference user account or a center-of-mass array. K, in this embodiment, is a predetermined number such as 10. The center-of-mass array is a derived array from a plurality of group channel arrays associated with a plurality of user identifiers. For example, in one embodiment, the plurality of user identifiers used to derive the center-of-mass array corresponds to a plurality of user accounts selected for invitation to join the group-based communication channel.

Overview

Various embodiments of the present disclosure generally relate to a method, apparatus, and system for providing group-based communication channel invite suggestions, which comprise recommendations of users to invite to group-based communication channels. These features improve the efficiency of the group-based communication system by improving the allocation of resources such as memory, processing power, and reduces network traffic and latency.

A need for the features disclosed herein arises because some group-based communication channels become inactive or lightly used. As the number of group-based communication channels that are available in the group-based communication system grows, the number of inactive group-based communication channels also grows. This results in an inefficient allocation of computing resources because the group-based communication system continues allocating the same resources for inactive group-based communication channels and active group-based communication channels.

To provide additional context, a set of group-based communication channels may be associated with a specific group identifier. A subset of these group-based communication channels may become inactive such that users associated with the same group identifier stop accessing and posting messages to these group-based communication channels. Because the group-based communication system maintains and supports these inactive group-based communication channels as if they were active group-based communication channels, an inefficient allocation of computing resources occurs. For example, the group-based communication system may continue allocating the same memory resources as those used for active group-based communication channels to store various data associated with these inactive group-based communication channels. The group-based communication system may also continue transmitting, via a communications network, interface data configured to cause client devices to display (via a group-based communication interface, which will be discussed in later sections of this disclosure) and make accessible to users these inactive group-based communication channels. This results in an inefficient use of the communications network and the display capabilities of the client devices. Finally, the group-based communication system makes use of its processing resources to continue to support operations associated with the inactive group-based communication channels.

To solve these inefficiencies, the group-based communication system delivers recommendations for users to join group-based communication channels. The group-based communication system delivers recommendations of these users when another user elects to invite anyone to a group-based communication channel such as when creating a new group-based communication channel. To improve the effectiveness of these invitations, the group-based communication system provides, to the selecting user, channel invite suggestions that are based on similarity scores. This feature improves the efficiency of and allocation of resources in the group-based communication system by increasing the likelihood that group-based communication channels remain active. Additionally, because users utilize computing resources when searching for relevant group-based communication channels to join, the disclosed invention reduces the demands on the infrastructure that implements the group-based communication system. In other words, because the group-based communication system facilitates the discovery of relevant channels for its users, fewer resources are expended as a result of users searching relevant group-based communication channels. As the number of search requests associated with these searches decreases, the group-based communication system may free up computing resources and network bandwidth for other tasks. Alternatively, due to the increased efficiency, the group-based communication system may be implemented with reduced infrastructure capabilities such as a communication network with a lower bandwidth or a set of processors having less processing power.

To put it more succinctly and in a slightly different light, the disclosed invention improves the performance of the group-based communication system that implements a channel invite suggestion functionality. By not having to retrieve the entire set of users that a user could invite via a predicted channel add interface, but instead retrieving only the most relevant users that are most likely to be invited and to engage in a group-based communication channel, the group-based communication system can function faster than if it had to retrieve the entire set of users. The inefficiencies associated with retrieving the entire set of users would increase as the group-based communication system scales in size. Thus, the disclosed invention permits the group-based communication system to seamlessly scale in size (e.g. supporting more group-based communication channels and users) while maintaining the same performance for a channel invite suggestion functionality. The disclosed improvements also frees up computing resources that can then be better utilized for other computing tasks.

Further details regarding the implementation of these recommendations or channel invite suggestions are provided below. For example, the group-based communication system utilizes an improved method for determining the users included in these recommendations. The disclosed methods that form part of this disclosure result in improved recommendations that are based on scores that predict the relevance of the users included in the channel invite suggestions.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
     <timestamp>2020-12-31 23:59:59</timestamp>
     <user_accounts_details>
          <user_account_credentials>
               <user_name>ID_user_1</user_name>
               <password>abc123</password>
               //OPTIONAL <cookie>cookieID</cookie>
               //OPTIONAL <digital_cert_link>www.mydigitalcertificate.com/
JohnDoeDaDoeDoe@gmail.com/mycertifcate.dc</digital_cert_link>
               //OPTIONAL <digital_certificate>_DATA_</digital_certificate>
          </user_account_credentials>
     </user_accounts_details>
     <client_details> //iOS Client with App and Webkit
          //it should be noted that although several client details
          //sections are provided to show example variants of client
          //sources, further messages will include only on to save
          //space
          <client_IP>10.0.0.123</client_IP>
          <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
          <client_product_type>iPhone6,1</client_product_type>
          <client_serial_number>DNXXX1X1XXXX</client_serial_number>
     <client_UDID>3XXXXXXXXXXXXXXXXXXXXXXXD</client_UDID>
          <client_OS>iOS</client_OS>
          <client_OS_version>7.1.1</client_OS_version>
          <client_app_type>app with webkit</client_app_type>
          <app_installed_flag>true</app_installed_flag>
          <app_name>nickname.app</app_name>
          <app_version>1.0 </app_version>
          <app_webkit_name>Mobile Safari</client_webkit_name>
          <client_version>537.51.2</client_version>
     </client_details>
     <client_details> //iOS Client with Webbrowser
          <client_IP>10.0.0.123</client_IP>
          <user_agent_string>Mozilla/5.0 (iPhone; CPU iPhone_OS 7_1_1 like Mac OS
X) AppleWebKit/537.51.2 (KHTML, like Gecko) Version/7.0 Mobile/11D201
Safari/9537.53</user_agent_string>
          <client_product_type>iPhone6,1</client_product_type>
          <client_serial_number>DNXXX1X1XXXX</client_serial_number>
     <client_UDID>3XXXXXXXXXXXXXXXXXXXXXXX3</client_UDID>
          <client_OS>iOS</client_OS>
          <client_OS_version>7.1.1</client_OS_version>
          <client_app_type>web browser</client_app_type>
          <client_name>Mobile Safari</client_name>
          <client_version>9537.53</client_version>
     </client_details>
     <client_details> //Android Client with Webbrowser
          <client_IP>10.0.0.123</client_IP>
          <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
          <client_product_type>Nexus S</client_product_type>
          <client_serial_number>YXXXXXXXXZ</client_serial_number>
          <client_UDID>FXXXXXXXXX-XXXX-XXXX-XXXX-
XXXXXXXXXXXXX</client_UDID>
          <client_OS>Android</client_OS>
          <client_OS_version>4.0.4</client_OS_version>
          <client_app_type>web browser</client_app_type>
          <client_name>Mobile Safari</client_name>
          <client_version>534.30</client_version>
     </client_details>
     <client_details> //Mac Desktop with Webbrowser
          <client_IP>10.0.0.123</client_IP>
          <user_agent_string>Mozilla/5.0 (Macintosh; Intel Mac OS X 10_9_3)
AppleWebKit/537.75.14 (KHTML, like Gecko) Version/7.0.3
5afari/537.75.14</user_agent_string>
          <client_product_type>MacPro5,1</client_product_type>
          <client_serial_number>YXXXXXXXXZ</client_serial_number>
          <client_UDID>FXXXXXXXXX-XXXX-XXXX-XXXX-
XXXXXXXXXXXXX</client_UDID>
          <client_OS>Mac OS X</client_OS>
          <client_OS_version>10.9.3</client_OS_version>
          <client_app_type>web browser</client_app_type>
          <client_name>Mobile Safari</client_name>
          <client_version>537.75.14</client_version>
```

```
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have attached a copy
our patent policy.</contents>
    <attachments>patent_policy.pdf</attachments>
    <conversation_primitive>
        conversation includes messages: ID_message_8,
ID_message_9, ID_message_10,
            ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200 shown in FIG. 2. The apparatus 200 may include a processor 202, a memory 201, input/output circuitry 203, communications circuitry 205, group-based communication repository 107 and group-based communication circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 101A-101N to enable message sharing therebetween. The processor 202 ensures that messages intended for exchange between the client devices 101A-101N within the particular communication channel are properly disseminated to those client devices 101A-101N for display within respective display windows provided via the client devices 101A-101N.

Moreover, the processor 202 may be configured to synchronize messages exchanged on a particular communication channel with a database for storage and/or indexing of messages therein. In certain embodiments, the processor 202 may provide stored and/or indexed messages for dissemination to client devices 101A-101N.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

Data Structures for Channel Invite Suggestions

The group-based communication server 106 generates channel data that is subsequently processed to capture relationships between users, between users and group-based communication channels, between users and their word usage, between users and topics, between group-based communication channels, or the like. The group-based communication server 106 then accesses the data that captures these relationships to provide channel invite suggestions. In one embodiment, the group-based communication server 106 delivers the channel invite suggestions when a user is in the process of creating a new group-based communication channel. In another embodiment, the group-based communication server 106 delivers the channel invite suggestions when a user accesses an invitation tool associated with a previously created group-based communication channel.

FIG. 9 illustrates an exemplary method for generating and storing various data structures used for providing channel invite suggestions and for generating a predicted channel add object based on the various data structures. Examples of message data storage, search and management apparatuses, and methods for use with embodiments of the present disclosure are disclosed in U.S. patent application Ser. No. 15/604,584, titled "MESSAGING SEARCH AND MANAGEMENT APPARATUSES, METHODS AND SYSTEMS," filed May 24, 2017, U.S. patent application Ser. No. 15/604,589, titled "MESSAGING SEARCH AND MANAGEMENT APPARATUSES, METHODS AND SYSTEMS," filed May 24, 2017, and U.S. patent application Ser. No. 15/651,887, titled "MESSAGING SEARCH AND MANAGEMENT APPARATUSES, METHODS AND SYSTEMS," filed Jul. 17, 2017, the contents of which are incorporated herein by reference in their entirety.

In embodiments, method 9000 includes, at step 910, the group-based communication server 106 stores channel membership data, channel starring data, and channel activity data in a plurality of data structures comprising channel data. These data structures thus comprise channel data that is recorded during the regular operations of the group-based communication system. For context, the channel membership data comprises information that identifies the members of a group-based communication channel. The channel starring data comprises information that identifies whether members have starred a group-based communication channel. And the channel activity data comprises information that captures user activity associated with a group-based communication channel. For example, the group-based communication server 106 stores in the data structures generated at 910 information regarding the number of times each group-based communication channel member reads messages from and posts messages to group-based communication channels.

Before discussing additional details regarding the data structures generated at 910, additional context regarding the functionality of group-based communication channels is herein provided with reference to FIG. 3. The group-based communication server 106 hosts a plurality of group-based communication channels configured to display messaging communications posted by users who are channel members. FIG. 3 shows an exemplary and non-limiting embodiment of a group-based communication interface 300 that illustrates various features associated with a group-based communication channel.

In some embodiments, the group-based communication interface 300 depicted in FIG. 3 may be accessed via an application that executes locally and causes a client device 101A-101N to be configured to function as a specialized machine. Additionally or alternatively, cloud-based, multi-tenant, thin-client, and/or other types of online service techniques may be used. For example, the group-based communication interface 300 may be provided by one or more applications that execute on a remote device, such as a server (e.g. group-based communication server 106) and/or other networked machine. User input information may be generated by and sent from the client device 101A-101N to a remote device (e.g. group-based communication server 106), while visual and/or audio information is sent from the remote device (e.g. group-based communication server 106) to the device of the third party application provider. Even though the following discussion suggests that the disclosure presented herein utilizes the method of a remote group-based communication server 106, the disclosure can be adapted to be implemented using a locally executed application stored and executed in client device 101A-101N.

Returning to FIG. 3, the group-based communication server 106 is configured to transmit to a client device 101A-101N a payload object configured to cause the client device to display a group-based communication interface 300. In FIG. 3, the group-based communication interface 300 is depicted as displaying a workspace, My Test Workspace, to which a user John Smith belongs. Because John Smith has access to My Test Workspace, the user account corresponding to user John Smith is necessarily associated with the same group identifier associated with My Test Workspace.

My Test Workspace comprises a plurality of group-based communication objects such as group-based communication channels, Channels A-D (see FIG. 3, item 340), and the user account for John Smith. However, My Test Workspace could include other group-based communication objects such as emojis, direct messages, digital files including text, spreadsheets, images, audio, or the like.

As illustrated in FIG. 3, Channel B has been selected for view as indicated by the perimeter of the icon 350 representing Channel B in the group-based communication interface 300. Accordingly, the right-hand-side section of the group-based communication interface 300 displays the contents of the Channel B, which is a group-based communication channel 301. The group-based communication channel 301 comprises an input textbox 330, which enables a user to provide inputs to post messages. The client device receives user inputs intended as messages for input textbox 330. In response to receiving the user inputs via textbox 330, the client device 101A-101N sends a payload object to the group-based communication server 106 for processing. The group-based communication server 106 parses the payload object to determine the appropriate processing action. In this case, the group-based communication server 106 determines that the payload object comprises a message posted by user John Smith to Channel B of My Text Workspace. Then, the group-based communication server 106 sends the message for storing to the group-based communication repository 107. The group-based communication server 106 causes the group-based communication repository 107 to associate the posted message with group-based communication Channel B via the channel identifier corresponding to Channel B. Additionally, the group-based communication server 106 causes the group-based communication repository 107 to associate the posted message with the user identifier corresponding to the user John Smith. The group-based communication repository 107 may store additional information regarding the posted message such as the time of day when it was posted. After storing the message, the group-based communication server 106 is thus configured to send, to the client device, a payload object configured to cause the client device to render the posted messages on Channel B as shown by item 310 in FIG. 3.

In the particular embodiment of FIG. 3, user John Smith input the phrase "/weather 94901" into the input textbox 330, which caused the group-based communication server 106 to send a payload object that caused the client device 101A-101N to render the message shown in Channel B as illustrated FIG. 3, item 310.

Returning to step 910 of FIG. 9, the group-based communication server 106 is configured to store, in the group-based communication repository 107 and for every group-based communication channel, a data structure or a plurality of data structures that comprise various channel data. The group-based communication server 106 accesses and uses at least some of the channel data to support the operations associated with the functions of the group-based communication channels. For example, as mentioned above, the channel data may be retrieved to generate payload objects that the group-based communication server 106 transmits to client device 101A-101N. The client device 101A-101N may then, for example, use the payload object to render a group-based communication interface comprising a group-based communication channel. For each group-based communication channel, the channel data includes, for example, a group identifier indicating the workspace or group to which the group-based communication channel belongs, a plurality of user identifiers that indicate the users who are members of the group-based communication channel, a plurality of object identifiers that indicate the group-based communication objects that may be associated or included in the group-based communication channel, posted message data, user read data, user starring data, and the like. In at least one embodiment, the channel data is stored in more than one table, matrix, or data structure. For example, in one embodiment, the channel membership data (i.e. the plurality of user identifiers that indicate the users who are members of each group-based communication channel) is stored in one matrix such that each row corresponds to one user identifier and each column corresponds to one channel identifier. In this same embodiment, then the remaining channel data, such as posted message data, user reads data, user starring data, object identifiers, and the like), is stored in a separate matrix storing channel data for one group-based communication channel; in this separate matrix, each row corresponds to a user identifier and each column corresponds to a channel data type (e.g. object identifiers, user reads data, user starring data, and the like). In an alternate embodiment, both the channel membership data and all other channel data are stored in one single matrix where each row corresponds to a user identifier and each column corresponds to a channel data type and a channel identifier.

Thus, this matrix may store channel data for all group-based communication channels for a given workspace by appending additional columns whenever a new group-based communication channel is created.

The message data may be stored in the group-based communication repository 107 as a separate data file or memory location to which the data structure comprising the channel data simply points to. Alternatively, the data structure may include a certain amount of memory allocated to store the message data. The message data may be implemented as a group-based communication message corpus, channel message corpus, or thread message corpus. The message data also includes metadata associated with each of the posted messages such as the user identifier of the posting user, a timestamp, and the like.

In some embodiments, the channel data also includes user-channel read frequency data that tracks the number of times that specific users have accessed a group-based communication channel. The user-channel frequency data, in some embodiments, is a read counter that quantifies the number of times that specific users have read messages in a group-based communication channel. To provide further context, the group-based communication system records events such as user inputs that comprise an indication that a user has moved a cursor mark or a scrolling element while interacting with a group-based communication channel. The group-based communication system may thus analyze these recorded events to determine the number of times a user has read messages in a group-based communication channel. Thus, the user-channel read frequency data is generated based on user activity within a group-based communication channel. In some embodiments, the user-channel read frequency data may record the number of times that each user has accessed a group-based communication channel over a particular time period for purposes of reading messages posted in a particular group-based communication channel. However, in other embodiments, the user-channel frequency data may simply track the number of times that each user has accessed a group-based communication channel.

The channel data may also include user-channel access recency data, user-channel write frequency data, user-channel access frequency data, channel word count data, and the like.

Returning to method 9000, at step 920 the group-based communication server 106 generates comparison criteria data based on the channel data and stores the comparison criteria data in a user-channel data structure. Thus, at step 920, the group-based communication server 106 effectively generates a user-channel data structure. The user-channel data structure may comprise a single user-channel matrix or several user-channel matrices that, in the aggregate, collect all the information that makes up the user-channel data structure. To provide further context, the group-based communication server 106 includes a variety of modules or applications configured to analyze the plurality of data values that comprise the channel data for a plurality of group-based communication channels. In certain embodiments, the group-based communication system 105 includes a separate data warehouse configured to analyze the plurality of data values that comprise the channel data. Whether the analysis is performed in the group-based communication server 106 or a separate data warehouse, the analysis tools are configured to handle data sets that are so large as to be classifiable as "Big Data." Because the number of posted messages in the group-based communication system 105 can grow very rapidly as the number of groups, users, and group-based communication channels grow to the order of 10,000 or more, the group-based communication system 105 must be configured to analyze data in the order of exabytes, zettabytes, or larger amounts of data.

To carry out step 920 of method 9000, the group-based communication server 106 is thus configured to analyze the entirety of the plurality of data structures comprising channel data to generate a user-channel data structure. Thus, at 920, as a result of analyzing the channel data, the group-based communication system generates the comparison criteria data, which is used to populate a user-channel data structure. In certain embodiments, the user-channel data structure comprises one or more two-dimensional data structures and thus comprises one or more user-channel data matrices. In at least one embodiment, each row of a user-channel data matrix corresponds to a group-based communication channel (via a channel identifier) and each column corresponds to a user (via a user identifier). The user-channel data structure may also be embodied as a plurality of arrays or vectors, where each array or vector may correspond to a group-based communication channel or a user. Additionally, in embodiments where more than one two-dimensional user-channel data matrix is necessary to implement the disclosure, a multi-dimensional data structure may instead be employed. In some embodiments, the comparison criteria data that is stored in a user-channel data matrix captures membership information (i.e. whether a user is a member of a specific group-based communication channel), user activity levels (i.e. the frequency with which a user reads and/or posts messages in specific group-based communication channels), user word usage (i.e. the frequency with which a user mentions specific words in a group-based communication channel), channel access weight parameters, and/or the like.

FIGS. 4A-4B and FIGS. 5A-5B show exemplary non-limiting embodiments of a two-dimensional user-channel data matrix that may be generated at step 920 of method 9000. Each of the two-dimensional user-channel data matrices of FIGS. 4A-4B and FIGS. 5A-5B include a group identifier 401A/B, 501A/B, a plurality of channel identifiers 402A/B, 502A/B, and a plurality of user identifiers 403A/B, 503A/B. The group identifier 401A/B, 501A/B indicates the group to which the data stored in the user-channel data matrix corresponds to. The user-channel data matrix also stores in its various elements a plurality of values that capture relationships between group-based communication channels corresponding to the channel identifiers 402A/B, 502A/B and users corresponding to user identifiers 403A/B, 503A/B.

As depicted in FIG. 4A, a plurality of entries of the user-channel data matrix may be embodied as integers. As shown in FIG. 5A, these integers may take one of at least two values (e.g., 0 and 1) which indicate whether the user corresponding to a user identifier 503 is a member of the group-based communication channel corresponding to a channel identifier 502. A value of 0 indicates that a user is not a member of a group-based communication channel whereas a 1 indicates that a user is a member of the group-based communication channel. In other embodiments, instead of an integer, the values stored in each entry may be embodied as a Boolean taking one of two values.

To provide further context, with reference to the embodiment of FIG. 5A, the user-channel data matrix indicates that the user corresponding to user identifier U1 is a member of the group-based communication channel corresponding to channel identifier C1 (i.e. the entry corresponding to U1 and C1 stores a 1). Similarly, in this particular embodiment, the user-channel data matrix indicates that the user corresponding to user identifier U3 is not a member of the group-based communication channel corresponding to the channel identifier C3 (i.e. the entry corresponding to U3 and C3 stores a 0).

In an alternate embodiment of the user-channel data matrix, the plurality of entries of the user-channel data matrix take one of three possible integer values (e.g., 0, 1, and 2), which indicate whether a user is a member of a group-based communication channel and whether the user has starred the group-based communication channel. Here, a value of 0 indicates that a user is not a member of a group-based communication channel, a value of 1 indicates that a user is a member of the group-based communication channel, and a value of 2 indicates that a user has starred the group-based communication channel.

The group-based communication system 105 enables users to star group-based communication channels. Starring a group-based communication channel makes the starred group-based communication channels more easily accessible to a user in a group-based communication interface. For example, FIGS. 6 and 7 illustrate the functionality of starring a group-based communication channel. FIG. 6 illustrates an embodiment of a displayed group-based communication interface 600 where a user, John Smith, has not starred any group-based communication channels. Section 640 of FIG. 6 provides a list of accessible group-based communication channels to John Smith. As shown, Channels A, B, and C are all clustered together in the same section on the left-hand side of group-based communication interface 600.

FIG. 7 shows an exemplary embodiment of a group-based communication interface 700 corresponding to an embodiment in which a user, John Smith, has starred a group-based communication channel, Channel C. As shown in FIG. 7, section 750 now includes a representation of Channel C (item 760, which is an icon for Channel C), which the user may click to access the contents of Channel C. Section 750 is disposed at the top of the left-hand side panel of the group-based communication interface 700. As a result, the user, John Smith, may quickly and with minimal effort access Channel C via item 760. As depicted in FIG. 7, the remaining group-based communication channels that have not been starred remain accessible via section 740, which is located below section 750.

The effect of starring a group-based communication channel is meant to make a group-based communication channel more easily accessible by reducing the time and effort required from a user to access such starred group-based communication channel. Accordingly these benefits could be implemented via other methods such as placing the channel at the top-right-hand-side of a group-based communication interface, or changing the icon representing the starred group-based communication channel (via varying its color, shape or size), or the like. The user may further customize the order in which starred group-based communication channels are displayed in section 750, for example, so as to enable the user to more easily access each of the starred group-based communication channels when the user needs it.

Returning to FIGS. 4A-4B and FIGS. 5A-5B, in other embodiments of the user-channel data matrix, each entry may be embodied as a real number that may have a finite sequence of digits to the right of a decimal point. These numerical values comprise information regarding a channel access weight parameter associated with the user corresponding to a user identifier 403A/B, 503A/B and a group-based communication channel associated with a channel identifier 402A/B, 502A/B. For example, the user-channel data matrix depicted in FIG. 4B shows that the entries may be embodied as a float data type (i.e., type of data that can take the form of a number that has several digits after a decimal point). Other data types (e.g., decimal data types, long data types, double data types, big integer data types, etc.) may be employed to represent the channel access weight parameters. For example, with reference to FIG. 5B, the row corresponding to the group-based communication channel corresponding to channel identifier C1 stores values 0.6, 0.8, and 0.5. These values correspond to the users corresponding to user identifiers U1, U2, and U3 respectively. The user-channel data matrix thus indicates that the user corresponding to U2 (having a channel access weight parameter of 0.8) is more active in the group-based communication channel corresponding to C1 than the user corresponding to U3 (having a channel access weight parameter of 0.5) is.

In one embodiment, a channel access weight parameter comprises user-channel write frequency data such as a quantifier that reflects the number of posted messages in a given group-based communication channel that are attributable to a specific user. For example, the channel access weight parameter may comprise a counter that counts such number of posted messages, but it could alternatively comprise a different value such as a normalized version of the number of posted messages.

In another embodiment, the channel access weight parameter comprises channel-access read frequency data such as a counter that captures the number of times that a specific user has accessed a specific group-based communication channel to read posted messages (and this value may be over a period of time or not). The channel access weight parameter may thus comprise a counter that counts such number of reads or may comprise a different value such as a normalized version of the number of reads.

In yet another embodiment, the channel access weight parameter comprises a quantifier that combines both, the number of posted messages attributable to a specific user and the number of times that the specific user has accessed a specific group-based communication channel to read posted messages. In one embodiment, for example, the channel access weight parameter comprises the sum of two counters that keep track of the number of reads and number of posted messages by a specific user in a specific channel. In an alternative embodiment, the channel access weight parameter comprises a value determined by the logarithm of a sum of a weighted version of the number of reads and a weighted version of a number posted messages. One such embodiment is exemplified by equation (1) as presented below.

$$\text{Channel Access Weight Parameter} = \log(1+\alpha^* \text{num}_{reads}+\beta^* \text{num}_{writes}) \quad (1)$$

With reference to equation (1), $\text{num}_{reads}$ is a parameter comprising the number of times that a user has accessed a group-based communication channel to read posted messages. $\text{num}_{writes}$ is a parameter comprising the number of times that a user has posted messages in a group-based communication channel. Thus, $\alpha$ and $\beta$ are constants that define the weigh attributed to each of the number of reads and number of posted messages by a user.

In at least one embodiment, the group-based communication system 105 operates with a being greater than $\beta$ (e.g. $\alpha=1$; $\beta=5$). Thus, in this particular embodiment, the group-based communication system 105 determines channel access weight parameters that more heavily emphasize posted messages than number of reads when determining how active a user is in a given group-based communication channel. In other embodiments, $\beta$ is greater than $\alpha$ (e.g. $\alpha$=5; $\beta$=1), which would cause the channel access weight parameters to more heavily emphasize number of reads than posted messages. In yet other embodiments $\alpha$ is set equal to $\beta$, in which case the channel access weight parameters do not emphasize either number of reads or posted messages.

In yet other embodiments, the channel access weight parameter comprises user-channel access recency data, user-channel access frequency data, and/or channel word count data in addition or in place of the user-channel read frequency data and the user-channel write frequency data already discussed. Various different formulations of the channel access weight parameter may be derived using these parameters (e.g. user-channel access recency data, user-channel access frequency data, channel word count data, user-channel write frequency data and user-channel read frequency data) in order to fine tune a desired outcome when obtaining a similarity score as will be outlined with reference to FIGS. 10 and 11. Thus, each of these parameters may be multiplied by a weighting factor (such as $\alpha$ and $\beta$ as already discussed) and may be added or subtracted as necessary to achieve the desired performance from the similarity scores and the channel invite suggestions feature.

FIG. 8 shows yet another embodiment of a user-channel data matrix. In this embodiment, the user-channel data matrix comprises word count data that represents the number of times that a user has posted certain words in certain group-based communication channels. The user-channel data matrix depicted in FIG. 8 includes a plurality of channel identifiers 801, a plurality of user identifiers 802, and a plurality of words 803. Thus, each entry of this user-channel matrix comprises a counter value that indicates the number of times that a user corresponding to the user identifier 802 has mentioned each of the words 803 in each of the group-based communication channels corresponding to channel identifiers 801. To provide further clarity, in the particular embodiment of FIG. 8, a user corresponding to U1 has posted a plurality of messages in group-based communication channel corresponding to C2. In those posted messages, the user has mentioned the word "snack" a total of 63 times, the word "snack bar" a total of 8 times. On the other hand, the user corresponding to U2 has mentioned the word "snack" a total of 2 times in the group-based communication channel corresponding to C2 and so on.

In certain embodiments, the user-channel data matrix includes columns for every word in an English alphabet. The user-channel data matrix may also implement alphabets for languages other than English and may even combine alphabets in multiple languages or even all known languages and dialects.

In the particular embodiment of FIG. 8, the group-based communication system 105 would have to append entries to the user-channel data matrix in order to record data for all users and all group-based communication channels in a given workspace.

Additionally, various embodiments of the group-based communication system 105 may, in one single embodiment, generate one, more, or all of the user-channel data matrices discussed above, including those discussed with reference to FIGS. 4A-4B, FIGS. 5A-5B, and FIG. 8. In these embodiments, this plurality of user-channel data matrices would comprise, in the aggregate, a user-channel data structure (i.e. the data structure that captures all recorded or derived relationships that comprise the comparison criteria data). Also, in an alternate embodiment, a single user-channel data matrix may store all the comparison criteria data that comprises a user-channel data structure therein.

Returning to method 9000, one embodiment of this method incorporates an optional step 930. As part of this optional step, the group-based communication server 106 is configured to generate and store, in the group-based communication repository 107, a similarity-scores data structure based on the user-channel data structure that was generated at 920. FIGS. 10A-10B show method 10000, which is one exemplary embodiment of step 930 for generating and storing a similarity-scores data structure. FIGS. 10A-10B will be discussed in further detail in the following sections. For context, the similarity-scores data structure comprises a plurality of similarity scores that capture a degree of similarity between users of the group-based communication system 105.

After step 920 or after 930, in the embodiments of method 9000 that incorporate the optional step 930, the group-based communication server 106 then carries out step 940. There, the group-based communication server 106 is configured to generate a predicted channel add object in a group-based communication system based on the user-channel data structure, render a predicted channel add interface, and execute a channel invitation protocol. FIGS. 13A-13B and FIG. 17 show methods 14000 and 17000, which are two different embodiments of a step 940 for generating a predicted channel add object in a group-based communication system based on the user-channel data structure, render a predicted channel add interface, and execute a channel invitation protocol. FIGS. 13A-13B and FIG. 17 will be discussed in further detail in the following sections. For clarity, FIGS. 13A-13B show an embodiment of a step 940 for a method 9000 that incorporates the optional step 930. On the other hand, FIG. 17 shows an embodiment of a step 940 for a method 9000 that does not incorporate the optional step 930.

Similarity-Scores Data Structure

FIGS. 10A-10B show an exemplary flowchart that embodies a method 10000 for generating a similarity-scores data structure. As already discussed, method 10000 is an exemplary embodiment of a step 930 for generating and storing a similarity-scores data structure based on the user-channel data structure of method 9000. After step 920, method 10000 proceeds to step 1011, where the group-based communication server 106 generates a similarity-scores data structure and initializes it with null or no values for all its elements. In one embodiment, the similarity-scores data structure is a two-dimensional data structure such as a matrix or a data frame. The similarity-scores data structure may alternatively be embodied as a plurality of arrays or vectors, where each array or vector may correspond to a group-based communication channel or a user. Additionally, in embodiments where more than one two-dimensional similarity data structures are necessary to implement the disclosure, a multi-dimensional data structure may instead be employed.

In the embodiment where a similarity-scores data structure is a two-dimensional data structure such as a matrix or data frame, the similarity-scores data structure comprises a plurality of similarity-scores-data-structure rows and a plurality of similarity-scores-data-structure columns. Both, the similarity-scores-data-structure rows and columns, include entries associated with all the user identifiers corresponding to all the user accounts associated with users that belong to a specific group—i.e. those user accounts associated with a specific group identifier. In an alternate embodiment, the similarity-scores-data-structure rows and columns include entries for all the user identifiers for all the user accounts that are stored in the group-based communication repository 107 (i.e. all registered users in the group-based communication system 105).

To provide further context, FIG. 12A shows an embodiment of a similarity-scores data structure that has been initialized with null elements. 1301 is a group identifier that indicates which group the similarity-scores data structure corresponds to. 1302 identifies a plurality of similarity-scores-data-structure rows corresponding to the users who are members of the group corresponding to the group identifier 1301. And 1303 identifies a plurality of similarity-scores-data-structure columns also corresponding to the users who are members of the group corresponding to the group identifier 1301. In the particular embodiment illustrated in FIG. 12A, the group corresponding to group identifier 1301 has only three members associated with it: the users associated with user identifiers U1, U2, and U3.

Returning to method 10000, after the group-based communication server 106 generates and initializes the scores data structure, which also results in the similarity-scores data structure being stored in the group-based communication repository 107, the group-based communication server 106 then proceeds to block A. From block A, the group-based communication server 106 proceeds to step 1012. There, the group-based communication server 106 retrieves a similarity-scores-data-structure row storing a null element. As a specific example, with reference to the embodiment of FIG. 12A, the group-based communication server 106 may retrieve, from the group-based communication repository 107, the row corresponding to the user associated with user identifier U1. However, a person having ordinary skill would understand that because in the embodiment of FIG. 12A, all the rows that are associated with a user identifier have null values, the group-based communication repository 107 could retrieve any of the rows associated with user identifiers U1, U2, and U3.

At 1013, the group-based communication server 106 then determines the user identifier associated with the retrieved similarity-scores-data-structure row and designates it as the selected user identifier. To continue with the specific example provided above, the group-based communication server 106, after retrieving the similarity-scores-data-structure row storing a null element, would here determine that the user identifier U1 is associated with such row. The group-based communication server 106 would designate user identifier U1 as the selected user identifier.

At 1014, the group-based communication server 106 then retrieves, from a channel-user data structure, a group channel array associated with the selected user identifier, and designates the retrieved group channel array as a selected group channel array. The group-based communication server 106 may store the selected group channel array in the group-based communication repository 107 or in a volatile memory such as RAM (Random Access Memory). The latter improves the disclosure by reducing the speed with which the group-based communication server 106 carries out method 10000. The improved speed would be the result of the retrieve latency associated with a volatile memory, which are shorter than the retrieve latencies associated with non-volatile memories. To continue with the specific example provided above, at 1014 the group-based communication server 106 would retrieve, from the user-channel data structure corresponding to group identifier G827, the group channel array associated with user identifier U1 and would designate this group channel array as the selected group channel array. After step 1014, the group-based communication server 106 proceeds to block B.

From block B, the group-based communication server 106 proceeds to step 1015. There, the group-based communication server 106 determines a second user identifier corresponding to a null element in the retrieved similarity-scores-data-structure row (from step 1012). In simpler terms, if the retrieved similarity-scores-data-structure row is considered in the context of the similarity-scores data structure from which it was retrieved, at 1015 the group-based communication server 106 identifies the user identifier for a column where a null element is disposed. As a result, the group-based communication server 106 would thus, by the end of step 1015, have identified the row and column associated with a null element stored in the similarity-scores data structure as well as the user identifiers corresponding to those rows and columns. To provide further clarity, and to continue with the specific example of FIG. 12A provided above, at 1015, the group-based communication server 106 could determine that the second user identifier is, say, user identifier U3, which has a null element associated with it. (note that the second user identifier could also be U1 or U2 since the row for U1 FIG. 12A has null elements for all its entries, including those entries corresponding to U1 and U2).

Then, at 1016, the group-based communication server 106 retrieves, from a user-channel data structure, a group channel array associated with the second user identifier (determined at 1015). To do so, the group-based communication server 106 accesses, through the group-based communication repository 107, a user-channel data matrix. This user-channel data matrix is associated with the same group identifier as the similarity-scores data structure. The group-based communication server 106 then retrieves the proper group channel array therefrom. To continue with the specific example provided above, after the group-based communication server 106 determines that the second user identifier is user identifier U3, the group-based communication server 106 then retrieves, from the user-channel data matrix corresponding to group identifier G827, the group channel array associated with user identifier U3.

At 1017, the group-based communication server 106 then generates and stores, in the similarity scores data structure and in the retrieved similarity-scores-data-structure row, a similarity score based on the selected group channel array (retrieved at 1014) and the group channel array associated with the second user identifier (retrieved at 1016). FIG. 11 shows a method 11000 which is an exemplary embodiment of step 1017; the particular embodiment of method 11000 calculates a similarity score comprising a cosine similarity between two group channel arrays. FIG. 11 will be disclosed in further detail in a subsequent section of this disclosure. For context, the group-based communication server generates a similarity score by comparing comparison criteria data values as stored in the selected group channel array and the group channel array associated with the second user. The group-based communication server 106 then stores this similarity score in the proper entry of the similarity-scores data structure and in the proper entry of the retrieved similarity-scores-data-structure row (as retrieved in step 1012). To continue with the specific example from above in the context of FIG. 12A, the similarity score generated at 1017 is stored in the similarity-scores-data-structure row corresponding to user identifier U1 and the similarity-scores-data-structure column corresponding to user identifier U3. With reference to FIG. 12B, which shows an embodiment of a similarity-scores data structure in which all the null elements have been substituted with similarity scores, the similarity score of 0.45 is the result of generating a similarity score based on the reference array (the group channel array associated with U1) and the group channel array associated with the second user identifier (i.e. U3). In other words, the similarity score 0.45 is the value stored in the similarity scores data structure as a consequence of carrying out step 1017 (and naturally, a method 11000, which is an embodiment of step 1017).

At 1018, the group-based communication server 106 checks whether the retrieved similarity-scores-data-structure row (retrieved at 1012) associated with the selected user identifier has any additional null elements. If the group-based communication server 106 determines that this retrieved similarity-scores-data-structure row has additional null elements, the group-based communication server 106 proceeds to block B. As previously described, from block B, the group-based communication server 106 proceeds to step 1015. There, the group-based communication server 106 determines a second user identifier corresponding to a null element in the retrieved similarity-scores-data-structure row as previously described, and further repeats the remaining steps 1016-1018.

If, at 1018, the group-based communication server 106 determines that the similarity-scores-data-structure row has no more null elements stored therein, then the group-based communication server 106 proceeds to block C. From block C, the group-based communication server 106 proceeds to step 1019 as shown in FIG. 10B. At 1019, the group-based communication server 106 checks whether there are one or more similarity-scores-data-structure rows that store at least one null element. If the group-based communication server 106 determines that there are one or more similarity-scores-data-structure rows that store at least one null element, then the group-based communication server proceeds to block A. From block A, the group-based communication server proceeds to step 1012, where it retrieves a similarity-scores-data-structure row storing a null element. The group-based communication server then repeats the remaining steps of method 10000 as already discussed.

If, at 1019, the group-based communication server 106 determines that the similarity-scores-data structure does not include any null elements (i.e. there are no similarity-scores-data-structure rows that store at least one null element), then method proceeds to step 940 of method 9000, which signifies the end of method 10000. At the end of method 10000, the similarity-scores data structure thus stores no null values because all the null values are substituted with similarity scores as a result of executing method 10000 to completion. FIG. 12B shows an exemplary embodiment of a similarity-scores data structure that that has no null values. FIG. 12B is representative of a similarity-scores data structure that results from method 10000. It should be understood that, in various embodiments, the number of rows and columns of the similarity-scores data structure would increase according to the number of members in a group or workspace.

In a group-based communication system 105 comprising a plurality of groups, the group-based communication server 106 would carry out method 10000 for each group. As a result, the group-based communication repository 107 would store a plurality of similarity-scores data structures, such that each similarity-scores data structure would capture the similarities between all the group members belonging to a single group. In an alternate embodiment, the group-based communication system 105 may implement this feature as a single multi-dimensional data structure as opposed to a plurality of two-dimensional data structures, such that the single multi-dimensional data structure stores the similarity-scores for all existing groups in the group-based communication system.

This disclosure has discussed in detail a similarity-scores data structure that captures a level of similarity (via the similarity scores) between users based on the comparison criteria data that was previously discussed in the context of the user-channel data structures. The comparison criteria data may capture information regarding user membership, starring, user activity, and word usage in group-based communication channels. However, in alternative embodiments, the similarity scores may also be based on a similarity score that takes into account other characteristic of user accounts. Such characteristics may include, for example, a professional role associated with a user account (such as a designation in the user account that indicates whether a user is an accountant, engineer, software developer, legal associate, marketing associate, manager, project leader, legal partner, technology director, finance director, operations director, marketing director, chief executive office, chief technical officer, chief finance officer, chief operations officer, external client, etc.), user location, user time zone, or the like. Each user account may store data fields that capture these information types. In these embodiments, these characteristics would be captured and stored as part of the comparison criteria data stored in the user-channel data structure. Additional data fields may be considered and the disclosure disclosed herein is not to be limited to the specific disclosed embodiments of the comparison criteria data. In other words, other comparison criteria data may be used to compare users and generate a similarity scores between such users.

Similarity Scores

FIG. 11 shows an exemplary flowchart that embodies a method 11000 for generating a similarity score. Method 11000 is an exemplary embodiment of a step 1017 of a method 10000 for generating and storing, in the similarity scores data structure and in the retrieved similarity-scores-data-structure row, a similarity score based on the selected group channel array and the group channel array associated with the second user identifier. In the particular embodiment of method 11000 as shown in FIG. 11, the group-based communication server 106 is configured to generate a cosine similarity between two group channel arrays. Other methods or steps for generating a cosine similarity are also contemplated in this disclosure, and the invention is not limited to the specific steps disclosed in FIG. 11. As will also be discussed, methods other than calculating a cosine similarity may also be implemented as part of step 1017.

With reference to FIG. 11, at step 1110, the group-based communication server 106 accesses two group channel arrays from the user-channel data structure. These two group channel arrays form the basis for generating the similarity score. In the context of method 10000, the two group channel arrays correspond to the selected group channel array retrieved from step 1014 and the group channel array associated with the second user identifier that was retrieved at 1016.

At 1120, the group-based communication server 106 generates and stores, in either the group-based communication repository 107 or a volatile memory, the product of each first-user-array element with itself and each second-user-array element with itself. In other words, here, the group-based communication server 106 may, for example, multiply the first element in the first group channel array with itself and store the product, multiply the second element in the first group channel array with itself and store the product, and so on until all the elements in the first group channel array are so multiplied. For completeness, the group-based communication server 106 associates the resulting products with the first group channel array. The group-based communication server 106 repeats the same operation with regards to the second group channel array such that all the elements in the second group channel array are multiplied in a similar manner and associated with the second group channel array also in a similar manner.

At 1130, the group-based communication server 106 then generates and stores, in either the group-based communication repository 107 or a volatile memory, the sum of all the products generated at 1120 that are associated with the first group channel array. The group-based communication server 106 also associates this sum with the first group channel array. At 1140, the group-based communication server carries a similar operation but for the products generated at 1120 that are associated with the second group channel array and also associates the resulting sum with the second group channel array.

At 1150, the group-based communication server 106 then generates and stores, in either the group-based communication repository 107 or a volatile memory, the square root of the sum associated with the first group channel array (generated at 1130). The group-based communication server 106 also associates this square root with the first group channel array.

After step 1150, the group-based communication server 106 proceeds to block D. From block D, the group-based communication server 106 proceeds to step 1160, where the group-based communication server 106 then generates and stores, in either the group-based communication repository 107 or a volatile memory, the square root of the sum associated with the second group channel array (generated at 11400). The group-based communication server 106 also associates this square root with the second group channel array.

At 1170, the group-based communication server 106 generates and stores, in either the group-based communication repository 107 or a volatile memory, the product of the square root associated with the first group channel array (as generated at 1150) and the second group channel array (as generated at 1160).

At 1180, the group-based communication server 106 generates and stores, in either the group-based communication repository 107 or a volatile memory, the sum of all the products of the corresponding elements of the first group channel array and the second group channel array. In other words, the group-based communication server 106 multiplies the first element of the first group channel array by the first element of the second group channel array, the second element of the first group channel array by the second element of the second group channel array, the third element of the first group channel array by the third element of the second group channel array, and so on until all the elements in both arrays are so multiplied. The group-based communication server 106 then generates the sum of the products of the corresponding elements of the first group channel array and the second group channel array.

At 1190, the group-based communication server 106 generates and stores, in the group-based communication repository 107, a similarity score corresponding to the quotient generated by dividing the sum stored at 1180 by the product stored at 1170. Thus, the similarity score is generated based on a cosine similarity calculation.

In alternate embodiments, step 1017 and method 11000 are modified to generate the similarity score using alternate computing operations. For example, method 11000 may be modified to generate a similarity score comprising a Euclidean similarity between the first and second group channel arrays, where the first and second group channel arrays are treated as mathematical vectors. In an alternate embodiment, method 11000 is modified to generate a similarity score comprising a Pearson Correlation Coefficient, which would provide a measure of the linear correlation between the information stored in the first and second group channel arrays. Additionally, as alternate embodiments of those already described, the group-based communication system confers more weight to certain parameters than other parameters when calculating a similarity score. For example, in at least one embodiment, the similarity score is heavily influenced by starring channels because users who star the same channels likely have similar interests. Thus, before performing steps 1120-1190, the group-based communication system multiplies the entries of the group channel arrays corresponding to the starring of a channel by a weighting factor (e.g. 2) and, instead of using the original entries when performing steps 1120-1190, the group-based communication system instead uses the weighed parameters (i.e. the entries corresponding to the starring of a channel that were already multiplied by the weighting factor). In this manner, the final similarity score is more heavily influenced by the starring of a channel.

In other embodiments, more than one parameter may be more heavily weighed such that the calculated similarity scores are more heavily influenced by these parameters. In addition, the weighting factors may be varied to fine tune the outcome of the similarity scores. For example, whereas the entries indicating that the starring of a channel could be multiplied by 2, channel access weight parameters could be multiplied by 3 (thus conferring the channel access weight parameters more weight when calculating a similarity score). This effect may be desired because the channel access weight parameters reflect actual user activity (i.e. actual engagement of a user) whereas starring a channel indicates user preference (i.e. it's just an expression of preference but not necessarily of activity in a channel).

Channel Invite Suggestions (First Embodiment)

FIGS. 13A-13B show an exemplary flowchart that embodies method 14000 for generating a predicted channel add object in a group-based communication system based on the user-channel data structure, rendering a predicted channel add interface, and execute a channel invitation protocol. As previously discussed, method 14000 is one exemplary embodiment of a step 940 of a method 9000 that incorporates optional step 930. Thus, FIGS. 13A-13B embody a method 14000 for a method 9000 that incorporates the optional step of generating and storing a similarity-scores data structure based on the user-channel data structure as discussed in the context of FIGS. 10A-10B and method 10000.

At 1410, the group-based communication server 106 is configured to receive a channel creation request. The group-based communication server 106 may receive this request after a user provides a user input via a group-based communication interface rendered on a display of a client device. For example, as previously discussed, FIG. 6 shows a group-based communication interface 600 that is rendered on a display of a client device 101A-101N. The group-based communication interface 600 comprises an channel-creation actuator button 680, which enables a user input that comprises a request to create a new group-based communication channel. The user input comprises any of a click, finger tap, a series of key strokes on a keyboard, voice commands, or the like.

The client device 101A-101N, in response to receiving a user input comprising an actuation of a channel-creation actuator button 680, is then configured to transmit to the group-based communication server 106 a payload object that comprises a request to create a group-based communication channel. The payload object also comprises data that captures a user identifier and a group identifier, which the group-based communication server 106 may later use to properly generate the necessary associations that partly implement the group-based communication channel that is created at the conclusion of a method 14000. The user identifier discussed here corresponds to user identified that is associated with the user account that is, in turn, associated with the user who provided the channel creation request. Hereafter, this user will be referred to herein as the channel creator. The group identifier corresponds to the group to which the channel creator belongs (i.e. the group identifier associated with the user identifier of the channel creator).

At 1420, in response to receiving the request from step 1410, the group-based communication server finds a predetermined number of most similar user accounts to the user account of the channel creator. To perform this step, the group-based communication server 106 is configured to access a similarity-scores data structure such as one generated by the methodologies discussed in the context of step 930 and methods 10000 (see FIG. 10) and 11000 (see FIG. 11). In at least one embodiment, at 1420, the group-based communication server 106 first retrieves, from the group-based communication repository 107, a similarity-scores-data-structure row associated with the user identifier of the channel creator. The group-based communication server 106 then ranks the similarity data scores from highest to lowest. The group-based communication server 106 then determines the K highest similarity scores, where K is a predetermined parameter (e.g. 10). The group-based communication server 106 is then configured to store, in either the group-based communication repository 107 or a volatile memory, the K highest similarity scores and their associated user identifiers.

In some embodiments, method 14000 includes an optional step 1430, where the group-based communication server 106 also compares the K highest similarity scores to a minimum threshold similarity score (e.g. 0.2) and discards from consideration those similarity scores that are smaller than this threshold. Thus, the group-based communication server 106 may thus remove these smaller similarity scores, and their associated user identifiers, from the group-based communication repository 107 or the volatile memory.

After 1420 or 1430, in embodiments of method 14000 that implement optional step 1430, the group-based communication server 106 generates, at 1440, a predicted channel add object. In certain embodiments, the predicted channel add object identifies one or more user identifiers associated with the similarity scores that were identified as either being the K highest similarity scores (see step 1420) or as being the K-highest similarity scores that additionally exceed a minimum threshold similarity score (see step 1430), where K represents a predetermined number. For example, in one embodiment, the predicted channel add objects comprise the user identifiers themselves. However, in other embodiments, the predicted channel add objects comprise any other digitally generated digital object that identifies the relevant user identifiers. The group-based communication server uses the predicted channel add object to render a predicted channel add interface and its associated channel invite components.

At 1450, the group-based communication server 106 generates and transmits predicted channel add interface data configured to cause a rendering of a predicted channel add interface that comprises one or more channel invite components. The predicted channel add interface data is thus configured to cause a client device 101A-101N to render a predicted channel add interface. In some embodiments, the predicted channel add interface forms part of a channel creation interface also rendered on a display screen of a client device 101A-101N. To provide further context, an exemplary embodiment of a channel creation interface is shown in FIG. 14. FIG. 14, however, does not include a predicted channel add interface. In contrast, FIG. 15 shows an exemplary embodiment of a channel creation interface that includes a predicted channel interface 1560, which further comprises a channel invite component 1610. Additionally, FIG. 16 is another exemplary embodiment of a channel creation interface that includes a predicted channel interface 1650, which further comprises a plurality of channel invite components 1740.

Regarding FIG. 14, this embodiment of the channel creation interface enables user inputs, such as via a name input textbox 1510, that designate a name for the group-based communication channel. The interface also enables user inputs, such as via a purpose input textbox 1520, to optionally provide a description of the purpose for the group-based communication channel. The interface also enables user inputs, such as via a channel invite textbox 1530, to optionally search and designate other users that will receive an invitation to join the new group-based communication channel.

In the particular embodiment of the channel creation interface shown in FIG. 14, no channel invite suggestions are provided. In certain embodiments, such as in this particular embodiment, the group-based communication server 106 determines that no channel invite suggestions are to be provided to a channel creator in circumstances that meet certain criteria. For example, in circumstances where a channel creator is new to the group-based communication system 105, steps 1420-1430 of method 14000 may return or store no user accounts. This is a consequence of the limited activity and associations that have been generated and stored for the user account corresponding to the new user. For example, a new user may belong to no or a limited number of group-based communication channels, may have read and posted no messages or a limited number of messages to a plurality of group-based communication channels, and the like. Because of the limited user activity of a new user, when a new user requests to create a new group-based communication group, steps 1420-1430 of method 14000 yield no user accounts that are most similar to the user account associated with the channel creator and that also exceed a minimum threshold similarity score.

In certain embodiments, to address the problem discussed above, the group-based communication server 106 may, in response to determining that steps 1420-1430 yielded no user accounts, identify the most popular user accounts in a specific group (i.e. those user accounts that belong to the largest number of group-based communication channels in a specific group) and return the user identifiers corresponding to these most popular user accounts as the predicted channel add objects at 1440. As a consequence, the group-based communication server 106 would, at 1450, transmit predicted channel add interface data configured to cause a client device 101A-101N to render a predicted channel add interface that comprises one or more channel invite components that correspond to said most popular user accounts. In an alternate embodiment, the group-based communication server 106 may, instead of identifying the most popular user accounts, be configured to identify the user accounts of other new users.

FIG. 15 provides another exemplary embodiment of a channel creation interface as rendered on a display of a client device 101A-101N. The channel creation interface renders a channel invite suggestion for a channel creator. The channel invite suggestion is provided via predicted channel add interface 1560 (indicated by a dashed line). In this particular embodiment, channel invite component 1610 comprises a graphical representation of the user name "Itandalla," which is the user name associated with the user account found in steps 1420 and, optionally, 1430. In some embodiments, the user identifier associated with the user account corresponding to the name "Itandalla" is thus the predicted channel add object generated at 1440.

To enable the channel creator to invite a user to the channel being created, channel invite input textbox 1530 enables user input in the form of text or a string. A user may thus type the name of a user associated with a user account or, alternatively, the user may type part of the name of a user associated with a user account. The client device 101A-101N that renders the channel creation interface, then transmits to the group-based communication server 106 a payload object that includes data comprising the user input. Alternatively, the channel creator may, via a display screen of a client device 101A-101N, click or tap (with a finger) on channel invite component 1610. As a result, the client device 101A-101N generates a payload object comprising a user selection of a user to invite to the channel being created. The client device 101A-101N then transmits this payload object to the group-based communication server 106.

Returning to method 14000, after 1450, the group-based communication server 106 proceeds to block E. From block E, the group-based communication server 106 proceeds to step 1460, where the group-based communication server 106 receives a user selection of users to invite to the channel.

In response, at 1470, the group-based communication server 106 is configured to search, in the group-based communication repository 107, for a matching user account associated with the user input and transmit matched-user data. If, at 1470, the group-based communication server 106 does not find an exact match, in the group-based communication repository 107, for the user selection of a user to invite to the channel being created, the group-based communication server 106 then determines one or more user accounts associated with names that approximately match the user selection. Whether the group-based communication server 106 finds an exact or an approximate match or set of matches, the group-based communication server 106 then retrieves, from the group-based communication repository 107, data associated with the matched user account(s) and generates a payload object that it then transmits to the client device 101A-101N. The payload object comprises matched-user data which is configured to cause the client device 101A-101N to render the names of the matching (exact or approximate) user accounts as selectable icons in the channel invite input textbox 1530 (see e.g., the embodiment of the input textbox 1530 depicted in FIG. 16, which is populated with the names and icons representing user accounts that have been selected for invitation).

FIG. 16 provides an exemplary embodiment of a channel creation interface depicting circumstances in which a user has selected two user accounts in the manner just described. Thus, the channel invite input textbox 1530 of FIG. 16 incorporates two user names. In the context of FIG. 16, a predicted channel add interface 1650 is presented in the dashed box. There, a plurality of channel invite components 1740 are rendered for the channel creator. As in the context of FIG. 15, each of the channel invite components is based on a predicted channel add object which is the result of a predictive algorithm as implemented by methods 9000, 10000, 11000 and 14000. Each of the users corresponding to the user names "sfavrealuessard," "jsingh," and "zdeng" thus correspond to a different channel invite component and a different predicted channel add object. The manner in which these predicted channel add objects are determined will be described below in the context of the remaining steps of method 14000.

After completion of step 1470, the group-based communication server 106 proceeds to step 1480. FIG. 17 is a flowchart of an exemplary method 17000 which is an exemplary embodiment of a step 1480. In method 17000, from 1470, the group-based communication server 106 proceeds to 1710, where the group-based communication server 106 accesses a user account set corresponding to the predetermined number of most-similar user accounts to the user account associated with the channel creation request. For example, this set is the same set determined at step 1420 of method 14000.

At 1720, the group-based communication server 106, finds, for each user account associated with a user selection, a second user account set corresponding to a predetermined number of most-similar user accounts to the user account associated with the user selection. The user selection in this context refers to those user selections received, for example, at step 1460 of method 14000. The group-based communication server is configured to possibly receive more than one user selection as part of multiple iterations of step 1460, as will be discussed in further detail with respect to the remaining steps of 14000. Thus, step 1720 of method 17000 may involve finding more than one user account sets. In other words, for each user selection received at 1460 of method 14000, step 1720 finds a user account set corresponding to a predetermined number of most-similar user accounts.

To execute step 1720, the group-based communication server 106 is configured to access a similarity-scores data structure such as one generated by the methodologies discussed in the context of step 930 and methods 10000 (see FIG. 10) and 11000 (see FIG. 11). The group-based communication server 106 thus first retrieves, from the group-based communication repository 107, a similarity-scores-data-structure row associated with the user identifier corresponding to the user selection. The group-based communication server 106 then ranks the similarity data scores from highest to lowest. The group-based communication server 106 then determines the K highest similarity scores, where K is a predetermined parameter (e.g. 10). The group-based communication server 106 is then configured to store, in either the group-based communication repository 107 or a volatile memory, the K highest similarity scores and their associated user identifiers.

As already suggested, the group-based communication server 106 performs the functions just described for each of the user accounts corresponding to the user selections received at multiple iterations of step 1460.

At 1730, the group-based communication server 106 finds the intersection of the user account set corresponding to the predetermined number of most-similar user accounts to the user account associated with the channel creation request and each of the second user account sets corresponding to a predetermined number of most-similar user accounts for each of the user accounts associated with each of the user selections. In other words, at this step, the group-based communication server determines whether any user accounts are found in the sets found or accessed at 1710 and 1720. At the conclusion of 1730, the group-based communication server 106 proceeds to step 1490 of method 14000.

FIG. 18 shows a flowchart of an exemplary embodiment of a method 18000, which is an alternate embodiment of step 1480 of method 14000. In this embodiment, the group-based communication server 106 generates a center-of-mass array based on the user selections received at 1460. The group-based communication server 106 uses the center-of-mass array to find predicted channel add objects.

At 1810, the group-based communication server 106 retrieves, from the group-based communication repository 107, the group channel array associated with the user identifier corresponding to the user account associated with the channel creation request.

At 1820, the group-based communication server 106 retrieves, for each user account associated with a user selection, a group channel array associated with the corresponding user identifier. The user selections correspond to those received at multiple iterations of step 1460.

At 1830, the group-based communication server 106, generates a center-of-mass array based on the group channel array associated with the user identifier corresponding to the user account associated with the channel creation request and each of the group channel arrays associated with the user accounts associated with a user selection. Again, the user selections correspond to those received at multiple iterations of step 1460. The group-based communication server 106 generates the center-of-mass array by summing all the corresponding elements of the retrieved group channel arrays and dividing each of the resulting sums by a factor corresponding to the number of group channel arrays. To provide further context, in the embodiment of FIG. 16, for example, the group-based communication server 106 has received user selections corresponding to the user accounts associated with user names "Aaron Maurer" (item 1720) and "Luis Tandalla" (item 1730). The group-based communication server 106 then, at 1830 sums the first element in the group channel array associated with the channel creator, the first element in the group channel array corresponding to the account associated with item 1720, and the first element in the group channel array to the account associated with item 1730. And the group-based communication server 106 then divides the resulting sum by a factor of 3 (because there are three group channel arrays) and temporarily stores the result as the first element of the center-of-mass array. Then, the group-based communication server 106 proceeds to sum the second element in the group channel array associated with the channel creator, the second element in the group channel array corresponding to the account associated with item 1720, and the second element in the group channel array to the account associated with item 1730. And the group-based communication server 106 then divides the resulting sum by a factor of 3 (because there are three group channel arrays) and temporarily stores the result as the second element of the center-of-mass array. The group-based communication server 106 continues with this operation until all corresponding elements are summed, divided, and stored as elements of a center-of-mass array in a similar manner.

After 1830, the group-based communication server 106 proceeds to block H. From block H, the group-based communication server 106 proceeds to 1840.

At 1840, the group-based communication server 106 stores, in the group-based communication repository 107, the center-of-mass array and associates a center-of-mass identifier with the center-of-mass array. In at least one embodiment, the center-of-mass array is stored in a matrix in the same manner that other group channel arrays are stored. The center-of-mass array is associated with an center-of-mass array identifier that uniquely identifies the center-of-mass array.

At 1850, the group-based communication server 106 modifies the similarity-scores data structure to incorporate the center-of-mass array identifier. To do so, the group-based communication server may append an additional row and column to the similarity-scores data structure storing the similarity scores for a group or workspace. The additional row or column become associated with the center-of-mass array identifier such that the values stored therein would correspond to the similarity scores for the center-of-mass array. Initially, the similarity scores for the center-of-mass array are initialized to null values.

At 1860, the group-based communication server 106 generates and stores similarity scores for the center-of-mass array identifier by comparing the center-of-mass array with all remaining group channel arrays associated with a group identifier. For example, in one embodiment, the group-based communication server 106 employs a methodology similar to that disclosed in the context of steps 1015-1018 of method 10000 to determine the similarity scores for the center-of-mass array. In this context of steps 1015-1018, the center-of-mass array would be designated as the selected group channel array.

At 1870, the group-based communication server 106 finds a predetermined number of most-similar user accounts to the center-of-mass array identifier. To perform this step, the group-based communication server 106 is configured to access the similarity-scores data. In at least one embodiment, the group-based communication server 106 first retrieves, from the group-based communication repository 107, a similarity-scores-data-structure row associated with the center-of-mass identifier. The group-based communication server 106 then ranks the similarity data scores stored therein from highest to lowest. The group-based communication server 106 then determines the K highest similarity scores, where K is a predetermined parameter (e.g. 10). The group-based communication server 106 is then configured to store, in either the group-based communication repository 107 or a volatile memory, the K highest similarity scores and their associated user identifiers. In at least some embodiment, the group-based communication server 106 is also configured to discard those similarity scores (and associated user identifiers) that do not exceed a minimum pre-determined threshold (e.g. 0.2). At the conclusion of 1870, the group-based communication server 106 proceeds to step 1490 of method 14000.

FIG. 20 shows a flowchart of an exemplary embodiment of a method 20000, which is an alternate embodiment of step 1480 of method 14000. In this embodiment, the group-based communication server 106 generates an aggregate similarity score for each user account that has not been selected for invitation to a channel. The aggregate similarity score is based on one or more user selections received at 1460. The group-based communication server 106 then ranks the each user account that has not been selected for invitation to a channel. Optionally, the group-based communication server 106 is configured to determine a set of users having an aggregate similarity score that exceeds a minimum threshold.

At 2010, the group-based communication server 106 is configured to access a set of selected user accounts. To implement this step, the group-based communication server 106 is configured to keep track of the user identifiers corresponding to user selections received at step 1460 of method 14000. The user identifiers thus correspond to the user accounts that have been selected for invitation to the channel. At 2010, then, the group-based communication server accesses the log that keeps track of the user identifiers corresponding to these user accounts that have been selected for invitation.

At 2020, the group-based communication server 106 then calculates, for each user that has not been selected, an aggregate similarity score based on the selected users and the channel creator. The aggregate similarity score is calculated using equation (2) as presented below.

$$\text{Aggregate Similarity Score} = 1 - ((1-S1)*(1-S2)*(1-S3)* \ldots *(1-Sn)) \qquad (2)$$

In equation (2), S1 represents the similarity score between the user account that has not been selected for invitation and a user account corresponding to the channel creator. S2 represents the similarity score between the user account that has not been selected for invitation and a user account corresponding to a first selected user account (for example as received via a user selection such as at step 1460). S3 represents the similarity score between the user account that has not been selected for invitation and a user account corresponding to a second selected user account (for example as received via a user selection such as at step 1460). Sn represents the similarity score between the user account that has not been selected for invitation and a user account corresponding to the nth selected user account (for example as received via a user selection such as at step 1460).

An property of equation (2) is that the aggregate similarity score is always at least as high as the highest of S1, S2, S3, . . . , Sn.

At 2030, the group-based communication server 106 find a predetermined number of users that have not been selected and that have the highest predetermined number of aggregate similarity scores. In other words, the group-based communication server 106 accesses the aggregate similarity scores that were calculated at 2020 and finds the K-highest aggregate similarity scores, where K is a predetermined number of scores (e.g. 10). The group-based communication server 106 thus determines the set of K-users with the highest aggregate similarity scores.

At optional 2040, the group-based communication server 106 determines a set of users that have not been selected that have an aggregate similarity score that exceeds a minimum threshold. For example, the group-based communication server 106 compares a minimum threshold (e.g. 0.2) to each of the K-highest aggregate similarity scores and discards those that do not exceed the minimum threshold. The group-based communication server 106 thus returns only those users that have not been selected who have an associated aggregate similarity score that exceeds the minimum threshold. After 2040, the group-based communication server 106 proceeds to step 1490 of method 14000.

Returning to method 14000, at 1490, the group-based communication server 106 transmits additional predicted channel add interface data. The additional predicted channel add interface data is configured to cause the client device 101A-101N to update the rendering of a predicted channel add interface. To do so, the group-based communication server 106 generates additional predicted channel add objects based on the pre-determined number of additional most-similar user accounts based on the user selection (determined at 1480). For example, in the embodiment of FIG. 16, the predicted channel add interface 1650 has been updated to incorporate channel invite components 1740. The predicted channel add objects corresponding to channel invite components 1740 are thus based on the predetermined number of additional most-similar user accounts that were found at 1480. In the context of FIG. 16, the predicted channel add objects identify the user accounts corresponding to user names sfavrealessard, jsingh, and zdeng.

After 1490, the group-based communication server 106 proceeds to block G. From block G, the group-based communication server proceeds to step 1492, where the group-based communication server 106 determines whether additional user selections of users to invite have been submitted. To do this, the group-based communication server 106 is configured to send a payload object, to the client device 101A-101N, requesting the status of the channel invite input textbox 1530 or the channel creation interface. The group-based communication server 106 may send this payload object periodically (e.g. every second or every three seconds or the like). The client device 101A-101N, in response, sends a payload object comprising the contents of the channel invite input textbox 1530 or the channel creation interface.

If at 1492, the group-based communication server 106 determines that there are additional user selections of users to invite, the group-based communication server 106 proceeds to block E. From block E, the group-based communication server 106 proceeds to step 1460 and executes another iteration of steps 1460-1492 as already described.

On the other hand if, at 1492, the group-based communication server 106 determines that there are no additional user selections of users to invite, the group-based communication server 106 proceeds to step 1494, where the group-based communication server determines whether it has received a channel creation authorization. A client device 101A-101N generates and transmits a payload comprising a channel creation authorization when a user input activates a channel-creation-authorization actuator button 1550 (see FIG. 14). The channel creation authorization indicates that a channel creator has finished configuring the new group-based communication channel, has finished selecting users to invite to the new group-based communication channel and is ready to proceed with the channel creation.

At 1494, in circumstances where the group-based communication server 106 determines that it has not yet received the channel creation authorization, the group-based communication server 106 then proceeds to block G. From block G, the group-based communications server 106 proceeds to step 1492 and repeats any necessary steps already discussed in the context of method 14000. On the other hand, in circumstances where the group-based communication server 106 determines that it has received the channel creation authorization, the group-based communication server 106 proceeds to step 1496, where the group-based communication server 106 executes a channel invitation protocol.

In one embodiment, for example, at 1496, the group-based communication server sends a message to each of the users corresponding to the user accounts that were included in the final version of the channel invite input textbox 1530 or that were otherwise selected by the channel creator. The message sent to each of these users comprises an invitation to join the newly created group-based communication channel. These messages may be sent as a direct message to each of the user accounts. The messages may include an interactive component that is clickable or otherwise selectable by the invited users. The group-based communication server is thus configured to receive inputs indicating that the invited users have clicked on the interactive component comprising the invitation. In response, the group-based communication system is configured to update a channel access registry to add the invited user who has accepted the invitation. As a result, the group-based communication server would grant to the invited user access to the group-based communication channel.

After step 1496, method 14000 ends. At the conclusion of method 14000 the group-based communication server 106 is configured to generate all data structures comprising channel data that are necessary to support the operation of the newly created group-based communication channel. In addition, the group-based communication channel becomes available for other users to join.

Even though method 14000 was discussed in the context of creating a new group-based communication channel, the channel invite suggestions may be generated for pre-existing group-based communication channels. In these embodiments, the group-based communication system enables a group-based communication channel administrator or another user with invitation rights to provide user inputs comprising a request to invite additional users to the group-based communication channel. In these circumstances, the group-based communication system is configured to execute calculations similar to those disclosed with regards to method 14000 although they would be adapted for supporting the generation of channel invite suggestions for a pre-existing channel. In that sense, the group-based communication system is configured to provide a predicted channel add interface with its corresponding plurality of channel invite components based on predicted channel add objects. The principles of operation for this embodiment are similar to what has already been disclosed in the context of generating channel invite suggestions for a new group-based communication channel.

Channel Invite Suggestions (Second Embodiment)

FIG. 19 shows an exemplary flowchart that embodies method 19000 for generating a predicted channel add object in a group-based communication system based on the user-channel data structure, rendering a predicted channel add interface, and execute a channel invitation protocol. Method 19000 is one exemplary embodiment of a step 940 of a method 9000 that does not incorporate an optional step 930. Thus, FIG. 19 embodies a method 19000 for a method 9000 that does not incorporate the optional step of preliminarily generating and storing a similarity-scores data structure based on the user-channel data structure as discussed in the context of FIGS. 10A-10B and method 10000.

The embodiment of step 940 as implemented in method 19000 can be contrasted with the embodiment of step 940 as implemented in method 14000. A difference between these two embodiments is that method 14000 relies on a step in which the group-based communication server 106 first generates similarity scores for all users belonging to a workspace (i.e. step 930). These calculations take time and computing resources. By avoiding these preliminary calculations, method 19000 ensures that no resources are wasted calculating unused similarity scores. On the other hand, because method 19000 calculates similarity scores after receiving the channel creation request, method 19000 may cause a slower user experience following the channel creation request.

From step 920, method 19000 proceeds to step 1910, where the group-based communication server 106 receives a channel creation request associated with a user identifier. The channel creation request is similar to the channel creation request already discussed in the context of method 14000.

At 1920, the group-based communication server 106 accesses a group-based communication repository comprising a plurality of user identifiers, wherein each of the plurality of user identifiers is associated with a group channel array. For this step, the group-based communication server 106 is configured to access the user-channel data structure that was generated at 920 of method 9000.

At 1930, the group-based communication server 106 identifies a selected user identifier of the plurality of user identifiers and a selected group channel array associated with the selected user identifier, the selected user identifier corresponding to the user identifier.

At 1940, the group-based communication server 106 compares the selected group channel array to each group channel array associated with the remaining plurality of user identifiers to determine a similarity score for each compared group channel array pair. For example, in one embodiment, the group-based communication server 106 employs a methodology similar to that disclosed in the context of steps 1015-1018 of method 10000 to determine the similarity scores.

After 1940, the group-based communication server 106 proceeds to block I. From block I, the group-based communication server 106 proceeds to 1950.

At 1950, upon receiving the channel creation request and in circumstances where at least one channel array similarity score satisfies a predetermined threshold, the group-based communication server 106 generates a predicted channel add object. For this step, the group-based communication server 106 is configured to analyze the plurality of similarity scores generated as part of step 1940. Further, this step is similar to steps 1420 and 1430 that were already discussed in the context of method 14000. The group-based communications server 106 may implement the methodologies associated with 1420 and 1430 at 1950.

At 1960 the group-based communication server 106 renders a predicted channel add interface to a group-based communication interface of the group-based communication system based on the predicted channel add object, the predicted channel add interface comprising one or more channel invite components associated with a compared user identifier for any channel array similarity score that satisfies the predetermined threshold. The predicted channel add interface, the predicted channel add object, and the channel invite components were already discussed in the context of FIGS. 14-16 and this disclosure will not belabor such description in the context of method 19000.

At 1970, upon user engagement, the group-based communication server 106 executes a channel invitation protocol that is configured to add the compared user identifier to a channel access registry associated with the channel creation request. The channel invitation protocol is similar to the channel invitation protocol already discussed in the context of step 1496 already discussed in the context of method 14000.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus associated with a communication platform, the apparatus comprising at least one processor and at least one memory including a computer program code, the at least one memory and the computer program code configured to, with the at least one processor, cause the apparatus to:
receive, from a user computing device associated with a first user of the communication platform, a channel creation request comprising a first user identifier associated with the first user:
compare a first channel array associated with the first user to a second channel array associated with a second user to determine a similarity score between the first channel array and the second channel array; and
in response to determining that the similarity score between the first channel array and the second channel array is above the threshold score, generate a predicted channel add object for inviting the second user to join a new channel associated with the channel creation request.

2. The apparatus of claim 1, wherein the computer program code is further configured to cause the user computing device associated with the first user to render a predicted channel add interface to an interface of the communication platform based at least in part on the predicted channel add object.

3. The apparatus of claim 2, wherein the predicted channel add interface comprises a channel invite component associated with a second user identifier, the channel invite component being configured, upon user engagement, to execute a channel invitation protocol that is configured to add the second user identifier to a channel access registry associated with the channel creation request.

4. The apparatus of claim 1, wherein the first channel array comprises a first channel access weight parameter determined based on first user-channel access recency data associated with the first user and the second channel array comprises a second channel access weight parameter determined based on second user-channel access recency data associated with the second user.

5. The apparatus of claim 1, wherein the first channel array comprises a first channel access weight parameter determined based on first user-channel access frequency data associated with the first user and the second channel array comprises a second channel access weight parameter determined based on second user-channel access frequency data associated with the second user.

6. The apparatus of claim 5, wherein the first user-channel access frequency data comprises first user-channel read frequency data and the second user-channel access frequency data comprises second user-channel read frequency data.

7. The apparatus of claim 5, wherein the first user-channel access frequency data comprises first user-channel write frequency data and the second user-channel access frequency data comprises second user-channel read frequency data.

8. The apparatus of claim 5, wherein the first user-channel access frequency data is determined based on a first logarithm of first user-channel write frequency data and first user-channel read frequency data and the second user-channel access frequency data is determined based on a second logarithm of second user-channel write frequency data and second user-channel read frequency data.

9. The apparatus of claim 1, wherein the first channel array comprises a first channel access weight parameter determined based on first channel word count data associated with the first user and the second channel array comprises a second channel access weight parameter determined based on second channel word count data associated with the second user.

10. A machine-implemented method for generating a predicted channel add object in a communication platform, the method comprising:
receiving, from a computing device associated with a first user of the communication platform, a channel creation request comprising a first user identifier associated with the first user;
comparing a first channel array associated with the first user to a second channel array associated with a second user to determine a similarity score between the first channel array and the second channel array; and
in response to determining that the similarity score between the first channel array and the second channel array is above a threshold similarity score, generating the predicted channel add object for inviting the second user to join a new channel associated with the channel creation request.

11. One or more non-transitory computer-readable media having encoded thereon one or more computer-executable instructions for performing a method for generating a predicted channel add object in a communication platform, the method comprising:
receiving, from a computing device associated with a first user of the communication platform, a channel creation request comprising a first user identifier associated with the first user;
comparing a first channel array associated with the first user to a second channel array associated with a second user to determine a similarity score between the first channel array and the second channel array; and
in response to determining that the similarity score between the first channel array and the second channel array is above a threshold similarity score, generating the predicted channel add object for inviting the second user to join a new channel associated with the channel creation request.

12. An apparatus configured to generate a predicted channel add object in a communication platform, the apparatus comprising at least one processor and at least one memory including a computer program code, the at least one memory and the computer program code configured to, with the at least one processor, cause the apparatus to:
store channel data associated with a plurality of channels of the communication platform in a plurality of data structures, wherein the channel data comprises at least channel membership data that represents user identifiers associated with each channel of the plurality of channels;
generate comparison criteria data based at least in part on the channel data and store the comparison criteria data in a user-channel data structure, wherein a first user identifier of the communication platform is associated with a first channel array of the plurality of channels and a second user identifier of the communication platform is associated with a second channel array;

determine, based at least in part on the comparison criteria, that a similarity score between the first channel array and the second channel array is within a threshold similarity score; and based at least in part on the similarity score being within the threshold similarity score, generate the predicted channel add object to be rendered via a predicted channel add interface.

13. The apparatus of claim 12 wherein the computer program code is further configured to cause the apparatus to generate and store a similarity-scores data structure based on the user-channel data structure.

14. The apparatus of claim 13 wherein, to generate and store a similarity-scores data structure based on the user-channel data structure, the computer program code is further configured to cause the apparatus to:

generate and initialize a similarity-scores data structure with a plurality of null elements;

retrieve a similarity-scores-data-structure row storing a first null element;

determine that the first user identifier is associated with the retrieved similarity-scores-data-structure row and designate it as a selected user identifier;

retrieve, from the user-channel data structure, the first channel array associated with the selected user identifier, and designate the first channel array as a selected channel array;

determine that the second user identifier corresponds to a second null element in the retrieved similarity-scores-data-structure row;

retrieve, from the user-channel data structure, the second channel array associated with the second user identifier; and generate and store, in the similarity scores data structure and in the retrieved similarity-scores-data-structure row, the similarity score based on the selected channel array and the second channel array associated with the second user identifier.

15. The apparatus of claim 13 wherein, to generate the predicted channel add object to be rendered via the predicted channel add interface, the computer program code is further configured to cause the apparatus to:

receive a channel creation request associated with a channel-creator user identifier;

identify a predetermined number of most-similar user accounts to a user account associated with the channel-creator user identifier;

identify a first user accounts set, wherein each user account associated with the first user accounts set has a similarity score that exceeds the threshold score;

generate the predicted channel add object based at least in part on the first user accounts set;

generate, based at least in part on the predicted channel add object, a predicted channel add interface data configured to cause a rendering of the predicted channel add interface that comprises one or more channel invite components;

transmit, to a client device associated with the channel-creator user identifier, the predicted channel add interface data;

receive a first user selection of one or more users to invite to a communication channel associated with the channel creation request; and in response to receiving the first user selection, execute a channel invitation protocol that is configured to add one or more user accounts corresponding to the one or more users to a channel access registry associated with the communication channel.

16. The apparatus of claim 15 wherein, the computer program code is further configured to cause the apparatus to:

receive a second user selection of users to invite to a group-based communication channel;

find a predetermined number of additional most-similar user accounts based on the second user selection;

wherein to find the predetermined number of additional most-similar user accounts, the computer program code is further configured to cause the apparatus to:

identify, for a first user account associated with the first user selection, a second user accounts set corresponding to a predetermined number of most-similar user accounts to the first user account;

identify, for a second user account associated with the second user selection, a third user accounts set corresponding to a predetermined number of most-similar user accounts to the first user account; and find an intersection of the first user accounts set, the second user account sets and the third user accounts set.

17. The apparatus of claim 12, wherein the similarity score is determined based on a cosine similarity.

18. The apparatus of claim 12 wherein, to generate the predicted channel add object to be rendered via the predicted channel add interface, the computer program code is further configured to cause the apparatus to determine a center-of-mass array.

19. A machine-implemented method for generating a predicted channel add object in a communication platform, the method comprising:

storing channel data associated with a plurality of channels of the communication platform in a plurality of data structures wherein the channel data comprises at least channel membership data that represents user identifiers associated with each channel of the plurality of channels;

generating comparison criteria data based at least in part on the channel data and store the comparison criteria data in a user-channel data structure, wherein a first user identifier of the communication platform is associated with a first channel array of the plurality of channels and a second user identifier of the communication platform is associated with a second channel array;

determining, based at least in part on the comparison criteria, that a similarity score between the first channel array and the second channel array is within a threshold similarity score; and based at least in part on the similarity score being within the threshold similarity score, generating a predicted channel add object to be rendered via a predicted channel add interface.

20. One or more non-transitory computer-readable media having encoded thereon one or more computer-executable instructions for performing a method for generating a predicted channel add object in a communication platform, the method comprising:

storing channel data associated with a plurality of channels of the communication platform in a plurality of data structures wherein the channel data comprises at least channel membership data that represents user identifiers associated with each channel of the plurality of channels;

generating comparison criteria data based at least in part on the channel data and store the comparison criteria data in a user-channel data structure, wherein a first user identifier of the communication platform is associated with a first channel array of the plurality of channels and a second user identifier of the communication platform is associated with a second channel array;

determining, based at least in part on the comparison criteria, that a similarity score between the first channel array and the second channel array is within a threshold similarity score; and based at least in part on the similarity score being within the threshold similarity score, generating a predicted channel add object to be rendered via a predicted channel add interface.

\* \* \* \* \*